(12) United States Patent
Kubo et al.

(10) Patent No.: US 7,068,261 B2
(45) Date of Patent: Jun. 27, 2006

(54) LIQUID CRYSTAL DISPLAY DEVICE WITH A TOUCH PANEL

(75) Inventors: Kiichiro Kubo, Mobara (JP); Yoshikuni Nagashima, Isumi-machi (JP); Masaru Suzuki, Mobara (JP); Terunori Saito, Mobara (JP)

(73) Assignees: Hitachi, Ltd., Tokyo (JP); Hitachi Device Engineering Co., Ltd., Mobara (JP)

( * ) Notice: Subject to any disclaimer, the term of this patent is extended or adjusted under 35 U.S.C. 154(b) by 142 days.

(21) Appl. No.: 10/102,911

(22) Filed: Mar. 22, 2002

(65) Prior Publication Data

US 2002/0101399 A1    Aug. 1, 2002

Related U.S. Application Data

(63) Continuation of application No. 09/352,359, filed on Jul. 13, 1999, now Pat. No. 6,456,279.

(30) Foreign Application Priority Data

Jul. 14, 1998    (JP) ................. 10-198998

(51) Int. Cl.
G09G 5/00    (2006.01)
(52) U.S. Cl. .................... 345/173; 345/104
(58) Field of Classification Search ............. 345/104, 345/173, 174, 175, 176, 179
See application file for complete search history.

(56) References Cited

U.S. PATENT DOCUMENTS

| | | | |
|---|---|---|---|
| 2,761,056 A | 8/1956 | Lazo | |
| 4,672,153 A | 6/1987 | Kikuchi | |
| 4,811,507 A | 3/1989 | Blanchet | |
| 4,897,511 A | 1/1990 | Itaya et al. | |
| 5,127,050 A | 6/1992 | Takahashi et al. | |
| 5,341,231 A | 8/1994 | Yamamoto et al. | |
| 5,584,556 A | 12/1996 | Yokoyama et al. | |
| 5,670,755 A | 9/1997 | Kwon | |
| 5,774,107 A * | 6/1998 | Inou | 345/104 |
| 6,020,944 A | 2/2000 | Hoshi | |
| 6,088,074 A | 7/2000 | Suzuki | |
| 6,147,732 A | 11/2000 | Aoyama et al. | |
| 6,199,995 B1 | 3/2001 | Umemoto et al. | |
| 6,204,896 B1 | 3/2001 | Matsuhira et al. | |
| 6,264,343 B1 | 7/2001 | Miyashita et al. | |
| 6,362,815 B1 * | 3/2002 | Leenhouts | 345/173 |

FOREIGN PATENT DOCUMENTS

| | | |
|---|---|---|
| JP | 1-245220 | 9/1989 |
| JP | 5-158034 | 6/1993 |
| JP | 6-123885 | 5/1994 |
| JP | 6-194525 | 7/1994 |

(Continued)

*Primary Examiner*—Dennis-Doon Chow
(74) *Attorney, Agent, or Firm*—Antonelli, Terry, Stout and Kraus, LLP.

(57) ABSTRACT

A liquid crystal display device including a liquid crystal display panel having a first surface for displaying an image and a second surface different from the first surface, and a position information input device provided on a first-surface side of the liquid crystal display panel. The position information input device is made of a first substrate and a second substrate more easily deformable than the first substrate. A transparent insulation film is formed over a surface of the first substrate opposed to the second substrate, a first transparent electrode is provided on the transparent insulation film, and the transparent insulation film is located between the first substrate and the first transparent electrode.

16 Claims, 17 Drawing Sheets

FOREIGN PATENT DOCUMENTS

| | | |
|---|---|---|
| JP | 7-84705 | 3/1995 |
| JP | 8-272530 | 10/1996 |
| JP | 9-274536 | 10/1997 |
| JP | 10-198497 | 7/1998 |
| JP | 11-110131 | 4/1999 |
| JP | 11-344695 | 12/1999 |
| WO | WO 99/63394 | 12/1999 |

* cited by examiner

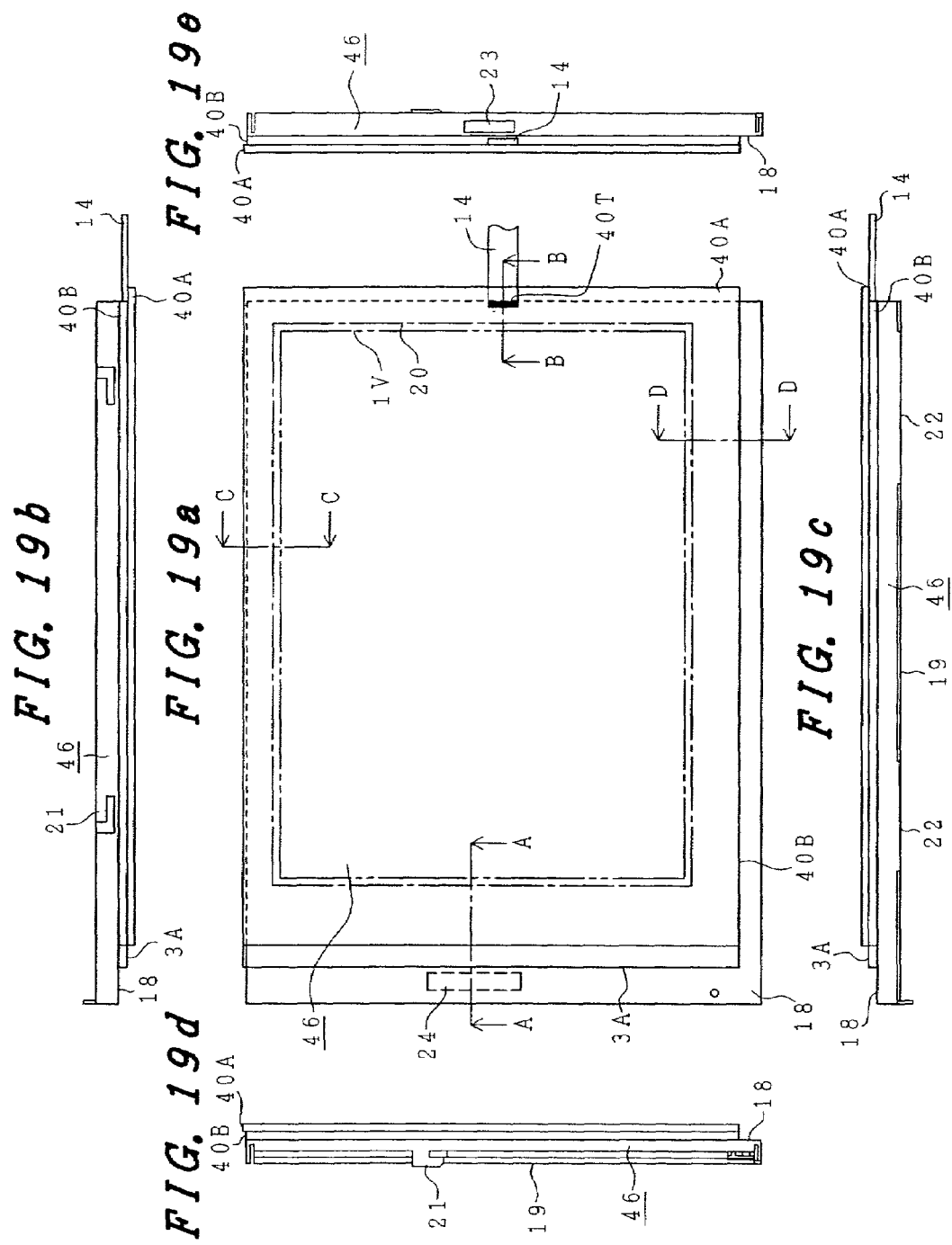

LIQUID CRYSTAL DISPLAY DEVICE WITH A TOUCH PANEL

CROSS REFERENCE TO RELATED APPLICATION

This is a continuation of U.S. application Ser. No. 09/352,359, filed Jul. 13, 1999, now U.S. Pat. No. 6,456,279, the subject matter of which is incorporated by reference herein.

BACKGROUND OF THE INVENTION

The present invention relates to a liquid crystal display device and, more particularly, to a liquid crystal display device in which an illumination light source and a touch panel are stacked on a reflection type of liquid crystal panel which modulates light incident from its display-surface side and allows the modulated light to exit toward the display-surface side.

In recent years, so-called liquid crystal display devices using liquid crystal panels have been widely used as display devices which serve as monitors for image reproducing apparatus or various information terminals.

In general, such a liquid crystal display device uses a passive matrix type of liquid crystal panel which is known as an STN type, or an active matrix type of liquid crystal panel using non-linear devices such as TFTS.

These types of liquid crystal panel are not of the self light emitting type, and so they require an illumination light source to form a visible image formed on the liquid crystal panel. Liquid crystal panels are divided into a transmission type and a reflection type. In monitors for information terminals, the transmission type of liquid crystal panel is widely used for the purpose of high-luminance and high-contrast display, and for this purpose a backlighting illumination light source (hereinafter referred to as a backlight) is installed on the back of the liquid crystal panel, and a visible image is formed by modulating light from this backlight to form an image on the liquid crystal panel.

FIG. 10 is a cross-sectional view illustrating an example of a conventional liquid crystal display device provided with a transmission type of liquid crystal panel and a backlighting illumination device, i.e., a so-called backlight. The conventional liquid crystal display device has a backlight stacked on the back of the transmission type of liquid crystal panel, and is constructed to modulate, with an image formed on the liquid crystal panel, illumination light which is emitted from the backlight and which passes through the liquid crystal panel. The modulated illumination light is caused to exit toward the obverse side of the liquid crystal panel, thereby making the image visible.

On the other hand, a so-called touch panel may be stacked on the display-surface side of such a liquid crystal display device so that information can be externally inputted from the display surface of the liquid crystal panel.

Specifically, this kind of liquid crystal display device is constructed in the following manner, as seen in FIG. 10. In a liquid crystal panel 1, a liquid crystal layer is clamped between two transparent substrates 1A and 1B, and polarizers 1C are respectively provided on the obverse-surface side and the back-surface side of the liquid crystal panel 1. An illumination light source 3 is provided, which includes an approximately rectangular transparent light guide plate 2, a light source (a light source made of a cold cathode fluorescent tube, a light emitting diode or the like) 3A installed along one edge of the light guide plate 2, and a reflection sheet 3B, and this illumination light source 3 is provided on the back surface of the liquid crystal panel 1. Light from the illumination light source 3 is deflected toward the liquid crystal panel 1 at an intermediate position, while being propagated in the light guide plate 2, and illuminates the liquid crystal panel 1 from the back surface thereof. A light scattering area 10 formed by dot printing or the like is provided on the back surface of the light guide plate 2.

Furthermore, a reflector 11 for totally reflecting light which has exited from the light guide plate 2 on the back-surface side thereof and for returning the light to the liquid crystal panel 1 is installed on the back side of the light guide plate 2.

Such a backlight is stacked on the liquid crystal panel 1 with a light quantity distribution correction member such as a scattering film 12 or a prism plate (not shown), being interposed therebetween, whereby a transmission type of liquid crystal display device is constructed.

The above-described liquid crystal panel is undesirably limited in reduction in power consumption because the two transparent substrates 1A and 1B arc used and the backlight installed on the back surface of the lower transparent substrate 1B is normally on.

In addition, a semi-transmission type liquid crystal display device is known in which a lower substrate of a liquid crystal panel is formed as a semi-transmissive substrate so that light (external light) incident from the display side of the liquid crystal panel is normally reflected by the lower substrate and is made to exit toward a display surface; whereas, if the quantity of external light is insufficient, an illumination device installed on the back surface of the liquid crystal panel is turned on. However, this type of device has the disadvantage that an insufficient contrast is obtained.

On the other hand, in a reflection type of liquid crystal display device in which a lower substrate of a liquid crystal panel is formed as a reflector, or when a reflector is installed on the back side of the lower substrate, since external light incident from a display surface is approximately 100% reflected and used for display, the contrast limitation experienced with the above-described semi-transmission type of liquid crystal display device is not a problem at all in a bright environment. However, in an environment in which external light, is insufficient, the contrast is insufficient as well. An illumination device may be installed to solve this problem, but unlike the semi-transmission type of liquid crystal display device, an illumination device cannot be installed on the back surface of the liquid crystal panel in the reflection type of liquid crystal display device.

In recent years, there has been a liquid crystal display device in which a touch panel 4 is stacked on the display-surface side of the liquid crystal panel 1 so that information may be externally inputted directly from the display surface of the liquid crystal panel 1. In this kind of touch panel, a spacer is inserted between at least two sheets or substrates which respectively have transparent conductive films formed on their inner surfaces opposed to each other, and a two-dimensional position on the liquid crystal panel is inputted by applying pressure at the position to vary the space between the two sheets or substrates.

The above-described illumination device for a liquid crystal panel has an optimum construction as a device which illuminates a transmission or semi-transmission type of liquid crystal panel from the back surface thereof. However, it is meaningless to apply the illumination device to a liquid crystal display device which uses a reflection type of liquid crystal panel positively utilizing external light in the above-described manner.

In the reflection type of liquid crystal display device, in order that light incident from the obverse-surface side be totally reflected and be again made to exit from the obverse-surface side, a reflector is provided on the back surface or a reflection layer is formed on the inner surface of a lower substrate of the two substrates which constitute the liquid crystal panel.

However, in the reflection type of liquid crystal display device which uses external light as illumination light, a display is difficult to identify in a dark environment in which the external light is insufficient.

If a touch panel for inputting information is stacked on the display surface of the liquid crystal panel, the quantity of transmitted light decreases and the screen of the liquid crystal panel becomes darker and darker.

Incidentally, Japanese Patent Application No. 351794/1997 describes an arrangement in which a touch panel for inputting information and an illumination device for a liquid crystal panel are formed integrally with each other. However, in the arrangement disclosed in Japanese Patent Application No. 351794/1997, since the surface of an illumination-and-touch panel on which a light guide is provided is not flat, the connection between electrodes of the touch panel is far from good. In addition, in the arrangement disclosed in Japanese Patent Application No. 351794/1997, the surface on which the light guide is provided needs to be formed into a staircase-like shape so that the light of a light source is guided to the liquid crystal panel, with the result that the surface on which the light guide is provided cannot be made flat.

One object of the present invention is to improve the coordinate recognition characteristics of an information input device (touch panel) which is provided on a liquid crystal panel.

Another object of the present invention is to provide a reflection or semi-transmission type of liquid crystal display device in which a touch panel is stacked on the display surface of its liquid crystal panel and its entire effective display area is uniformly illuminated by a front illumination system so that a high-quality image display can be obtained and the brightness of the screen can be improved.

SUMMARY OF THE INVENTION

The above objects are achieved by providing on a display-surface side of a reflection type of liquid crystal panel a touch panel made of a hard transparent lower substrate and a soft transparent upper substrate, providing a transparent insulation film on the lower substrate, and forming a transparent electrode on the transparent insulation film.

The above objects are achieved by a liquid crystal display device in which an illumination device made of a light guide plate and a light source and a touch panel are provided or integrated on a display-surface side of a reflection type of liquid crystal panel to uniformly illuminate its entire effective display area so that a high-quality image display can be obtained and the brightness of the screen can be improved.

Specifically, a liquid crystal display device according to the present invention comprises a liquid crystal display panel having a first surface for displaying an image and a second surface different from the first surface, and a position information input device provided on a first-surface side of the liquid crystal panel, wherein the position information input device is made of a first substrate and a second substrate, more easily deformable than the first substrate, a transparent insulation film is provided over a surface of the first substrate opposed to the second substrate, and a first transparent electrode is provided on the transparent insulation film.

Furthermore, in the liquid crystal display device, the first substrate of the position information input device is provided between the second substrate and the liquid crystal display panel.

Furthermore, in the liquid crystal display device, a second transparent electrode is provided over a surface of the second substrate opposed to the first substrate.

Furthermore, in the liquid crystal display device, a spacer made of an insulating material is provided between the first substrate and the second substrate.

Furthermore, in the liquid crystal display device, a recess portion is formed on the surface of the first substrate opposed to the second substrate, and the transparent insulation film covers the recess portion to reduce unevenness of the surface over which the transparent electrode is provided.

Furthermore, in the liquid crystal display device, a printed layer for partly reflecting light is formed on the surface of the first substrate opposed to the second substrate, and the transparent insulation film covers the printed layer to reduce unevenness of the surface over which the transparent electrode is provided.

Furthermore, in the liquid crystal display device, the first substrate and the second substrate are fixed to each other by double-sided adhesive tape.

A liquid crystal display device according to the present invention comprises a reflection type of liquid crystal display panel, an illumination device provided over a display surface of said reflection type of liquid crystal display panel, and an input device provided over said illumination device, wherein the input device is made of a first substrate which is hard and a second substrate which is soft and is superimposed on the first hard substrate, a second transparent electrode is provided over a surface of the second substrate opposed to the first substrate, a transparent insulation film is formed over the first substrate, and a first transparent electrode is formed over the transparent insulation film.

Furthermore, in the liquid crystal display device, the first transparent electrode is made of an integral electrical resistance film which flatly spreads over an entire coordinate input area, while the second transparent electrode is made of an integral electrical resistance film which flatly spreads over the entire coordinate input area.

Furthermore, in the liquid crystal display device, a line for electrically connecting the first transparent electrode and a corresponding terminal is provided at a periphery of the first transparent electrode over the first substrate, and a fixing member for fixing the first substrate and the second substrate to each other is provided in an area of the first substrate in which the line is provided.

Furthermore, in the liquid crystal display device, the first transparent electrode is made of a plurality of X electrodes arranged in a first direction, and the second transparent electrode is made of a plurality of Y electrodes arranged in a second direction.

Furthermore, in the liquid crystal display device, the liquid crystal panel has a plurality of display electrodes arranged in the first direction or the second direction, and the distance between adjacent ones of the X electrodes or the Y electrodes is made equal to the distance between adjacent ones of the display electrodes.

A liquid crystal display device according to the present invention comprises a reflection type of liquid crystal panel and a touch panel stacked on a display-surface side of the liquid crystal panel, for externally inputting information, wherein the touch panel includes a hard lower transparent substrate opposed to the liquid crystal panel, a soft upper substrate for externally inputting information, transparent electrodes formed over inner surfaces of the lower transparent substrate and the upper substrate, respectively, and a spacer which is clamped between the lower substrate and the upper substrate and isolates the transparent electrodes from each other with a predetermined spacing, a light source being installed along at least one edge of the lower substrate, a surface-treated surface being provided over a surface of the lower substrate which is closer to the transparent electrode, the surface-treated surface reflecting and scattering light from the light source toward the liquid crystal panel and allowing light reflected from the liquid crystal panel to exit toward the display-surface side, and a transparent insulation film being provided between the surface-treated surface and the transparent electrode.

Furthermore, in the liquid crystal display device, a plurality of microprisms are formed over the surface-treated surface of the lower substrate, the transparent insulation covering the microprisms and differing in refractive index from the lower substrate.

Furthermore, in the liquid crystal display device, the distance between adjacent ones of the microprisms which are on a side of the lower substrate which is close to the light source is larger than the distance between adjacent ones of the microprisms which are on a side of the lower substrate which is far from the light source.

Furthermore, in the liquid crystal display device, those microprisms which are on a side of the lower substrate which is close to the light source are smaller in size than the microprisms which are on a side of the lower substrate which is far from the light source.

Furthermore, in the liquid crystal display device, a plurality of printed patterns are flatly formed over the surface-treated surface of the lower substrate, and the transparent insulation film covers the printed patterns to make the surface over which the transparent electrode is provided substantially flat.

Furthermore, in the liquid crystal display device, the distance between adjacent ones of the printed patterns which are on a side of the lower substrate which is close to the light source is larger than the distance between adjacent ones of the printed patterns which are on a side of the lower substrate which is far from the light source.

Furthermore, in the liquid crystal display device, those printed patterns which are on a side of the lower substrate which is close to the light source are smaller in size than the printed patterns which are on a side of the lower substrate which is far from the light source.

A liquid crystal display device according to the present invention comprises a reflection type of liquid crystal panel, and a touch panel stacked on the liquid crystal panel, for externally inputting information to a display-surface side of the liquid crystal panel, and the touch panel includes a lower transparent substrate opposed to the liquid crystal panel, an upper substrate softer than the lower transparent substrate, transparent electrodes formed over inner surfaces of the touch panel, and a fixing member which secures the lower substrate and the upper substrate to each other with a predetermined spacing, a light source being installed along at least one edge of the lower substrate, a surface-treated surface being provided over a surface of the lower substrate which is closer to the transparent electrode, the surface-treated surface reflecting and scattering light from the light source toward the liquid crystal panel and allowing light reflected from the liquid crystal panel to exit toward the display-surface side, and a terminal which is electrically connected to the transparent electrode being provided on a side of the touch panel on which the light source is not provided.

In any of the above-described liquid crystal display devices according to the present invention, the coordinate recognition characteristics of the information input device (touch panel) provided on the liquid crystal panel are improved.

In addition, any of the above-described liquid crystal display devices according to the present invention can be applied, irrespective of the kind of liquid crystal panel (a passive matrix, active matrix and any other types of liquid crystal panels) and the screen size thereof, so that an image of good visibility which has high luminance and is uniform over its entire effective display area can be obtained even in an environment in which the external light is insufficient.

It is to be noted that the above-described illumination device need not normally use the light source, but may also be provided with a switch or the like which turns on or off the light source, as required, so as to make it possible to turn off the light source if the luminance of the external light is high or to turn on the light source, as required, if the external light has a low luminance.

BRIEF DESCRIPTION OF THE DRAWINGS

FIGS. 19a, 19b, 19c, 19d and 19e are views showing the external appearance of a liquid crystal display device according to a twelfth embodiment of the present invention;

FIG. 20a is a cross-sectional view taken along line A—A of FIG. 19a, FIG. 20b is a cross-sectional view taken along line B—B of FIG. 19a, FIG. 20c is a cross-sectional view taken along line C—C of FIG. 19a, and FIG. 20d is a cross-sectional view taken along line D—D of FIG. 19a;

DESCRIPTION OF THE PREFERRED EMBODIMENTS

Embodiments of the present invention will be described below in detail with reference to the accompanying drawings.

First Embodiment

Figure 1:
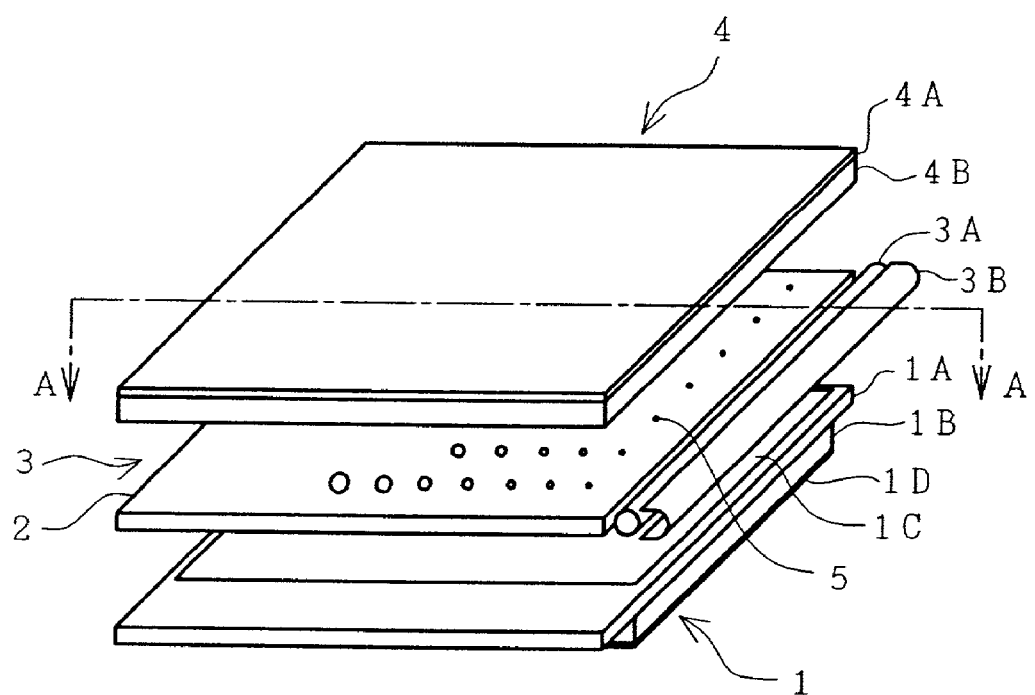
FIG. 1 is a developed perspective view illustrating the construction of a first embodiment of the liquid crystal display device according to the present invention.
Figure 2:
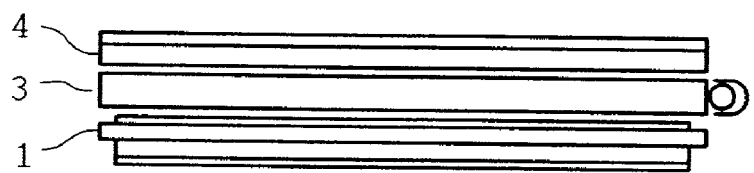
FIG. 2 is a diagrammatic cross-sectional view taken along line A—A of FIG. 1.

FIG. 1 is a developed perspective view illustrating the construction of a first embodiment of the liquid crystal display device according to the present invention, and FIG. 2 is a diagrammatic cross-sectional view taken along line A—A of FIG. 1. Reference numeral 1 denotes a reflection type of liquid crystal panel, reference numeral 1A denotes an upper transparent substrate, reference numeral 1B denotes a lower transparent substrate, reference numeral 1C denotes a polarizer, and reference numeral 1D denotes a reflector. Incidentally, in this embodiment, a transparent substrate is used as the lower substrate and the reflector is installed on the back surface of the lower substrate, but reflection processing may also be applied to the inner surface of the lower substrate.

Reference numeral 2 denotes a light guide plate which is made of acrylic material or the like and constitutes an illumination device, reference numeral 3 denotes an illumination device, reference numeral 3A denotes a linear lamp (a linear light source), reference numeral 3B denotes a reflecting sheet, reference numeral 4 denotes a touch panel, reference numeral 4A denotes a soft film sheet (an upper substrate), and reference numeral 4B denotes a hard substrate made of glass, acrylic or the like (a lower substrate; in the present embodiment, a glass plate).

The illumination device 3 which is formed by the light guide plate 2 made of acrylic material having a of thickness 1.5 mm, the lamp 3A and the reflecting sheet 3B stacked on the liquid crystal panel 1, and the touch panel 4 is stacked on the illumination device 3. The liquid crystal panel 1 is not limited to the shown reflection type of display device, and a semi-transmission type panel can also be used.

Incidentally, if the efficiency of utilization of light permits, it is preferable for the thickness of the light guide plate 2 to be smaller, for example, the thickness is preferably not greater than 1.5 mm.

The upper surface of the light guide plate 2, i.e., the side thereof closer to the touch panel 4, has a light-diffusing microprism-, slit- or dot-patterned unevenness or printing 5 (in the present embodiment, dot-patterned printing), and a cold cathode fluorescent tube of diameter 2.0 mm is used as the lamp 3A which constitutes the light source of the illumination device 3. Incidentally, if its luminous efficiency permits, it is preferable for the diameter of the lamp to be smaller, for example, the diameter is preferably not greater than 2.0 mm. However, since it cannot be said that a fluorescent tube of diameter smaller than 1.6 mm has good luminous efficiency, the diameter of the lamp 3A is preferably between 1.6 mm and 2.0 mm if a fluorescent tube is used as the lamp 3A.

Figure 3:
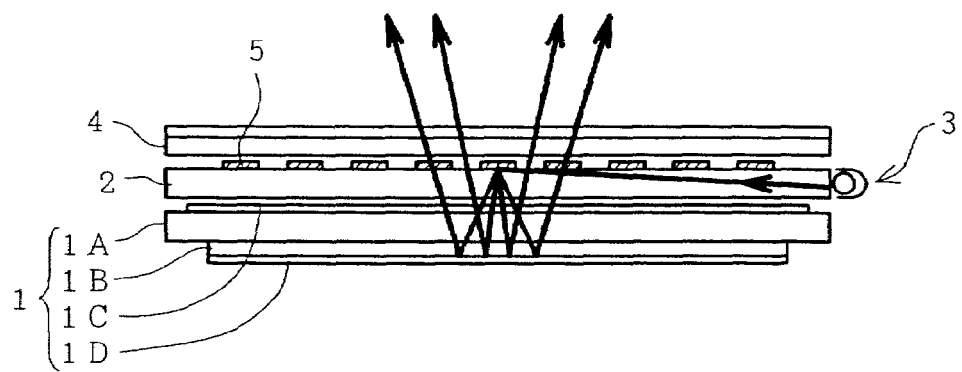
FIG. 3 is a diagrammatic cross-sectional view similar to FIG. 2, illustrating the operation of an illumination light source in the first embodiment of the liquid crystal display device according to the present invention.

FIG. 3 is a cross-sectional view similar to FIG. 2, illustrating the operation of an illumination light source in the first embodiment of the liquid crystal display device according to the present invention. Specifically, the touch panel-side surface of the light guide plate 2 which constitutes the illumination device 3 is provided with the dot-patterned printing 5, and, as shown by arrows in FIG. 3, light from the lamp 3A is reflected in the direction of the liquid crystal panel 1 and the light reflected from the liquid crystal panel 1 is transmitted through the touch panel 4 and exits on the display-surface side of the liquid crystal display device.

The liquid crystal panel, illumination light source and touch panel are bonded together at their ends by double coated tape.

Incidentally, the illumination light source may be normally on, but if the illumination light source is to be incorporated in a so-called PDA or a portable information device, such as a notebook personal computer, whose power consumption needs to be controlled, the illumination light source can be constructed to be turned on as required.

According to the present embodiment, it is possible to provide a liquid crystal display device with a touch panel, which has good visibility.

According to the embodiment shown in FIG. 3, since the light-reflecting pattern of the light guide plate 2 can be formed by printing, the light guide plate 2 is easy to manufacture.

Figure 4:
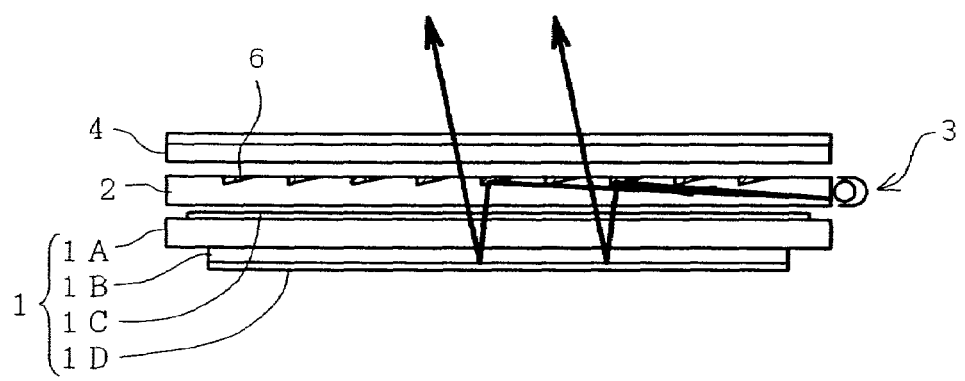
FIG. 4 is, a diagrammatic cross-sectional view similar to FIG. 3, illustrating another construction of the illumination light source and the operation thereof in the first embodiment of the liquid crystal display device according to the present invention.

FIG. 4 is a cross-sectional view similar to FIG. 3, illustrating another construction of the illumination light source and the operation thereof in the first embodiment of the liquid crystal display device according to the present invention. Specifically, in the present embodiment, a microprism-patterned uneven portion 6 is formed on the touch panel-side surface of the light guide plate 2 which constitutes the illumination device. As shown by arrows in FIG. 4, light from the lamp 3A is reflected and directed in the direction of the liquid crystal panel 1 by the microprism-patterned uneven portion 6, and the light reflected from the liquid crystal panel 1 is transmitted through the touch panel 4 and exits on the display-surface side of the liquid crystal display device. It is desirable for the inclined surface of each microprism to have an angle which enables total reflection of light from the lamp 3A. These microprisms may be formed like ridges in the width direction of the light guide plate 2 (in a direction parallel to the linear lamp). According to the present invention, it is possible to reflect the light of the lamp 3A to the liquid crystal panel 1 with high efficiency. Since the other elements of the construction are similar to that of the first embodiment, the description thereof is omitted.

Second Embodiment

Figure 5:
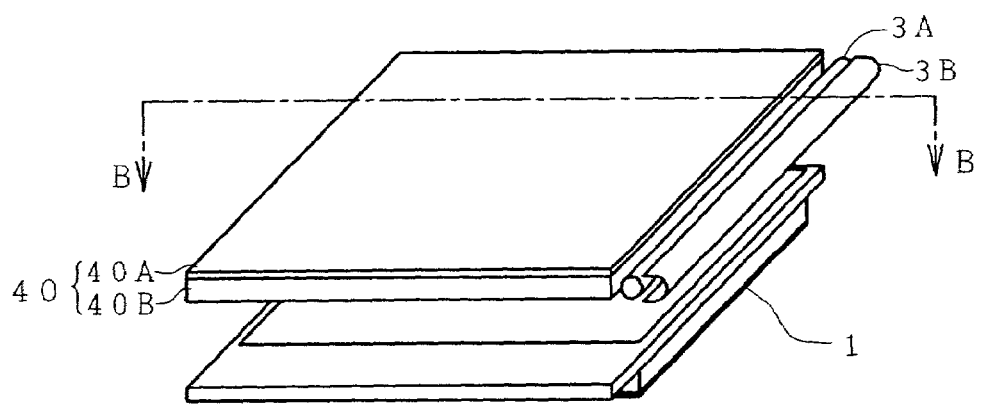
FIG. 5 is a developed perspective view illustrating the construction of a second embodiment of the liquid crystal display device according to the present invention.
Figure 6:
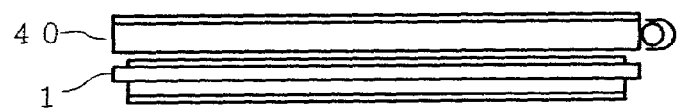
FIG. 6 is a diagrammatic cross-sectional view taken along line B—B of FIG. 5.

FIG. 5 is a developed perspective view illustrating the construction of a second embodiment of the liquid crystal display device according to the present invention, and FIG. 6 is a diagrammatic cross-sectional view taken along line B—B of FIG. 5. In the present embodiment, an illumination light source and a touch panel which are stacked on the liquid crystal panel 1 are integrated to reduce the thickness of the entire liquid crystal display device. Reference numerals which are identical to those used in FIGS. 1 and 2 denote functional portions identical to those of the first embodiment. Reference numeral 40 denotes an illumination-and-touch panel, reference numeral 40A denotes a transparent soft sheet which serves as the upper substrate of the touch panel, and reference numeral 40B denotes a transparent hard substrate which serves as both the lower substrate of the touch panel and a light guide plate for the illumination light source.

This transparent hard substrate 40B is made of an acrylic plate having a thickness of 1.5 mm, and a surface thereof is processed so that it can diffuse light. A polyester film is used as the upper transparent soft substrate 40A.

Figure 7:
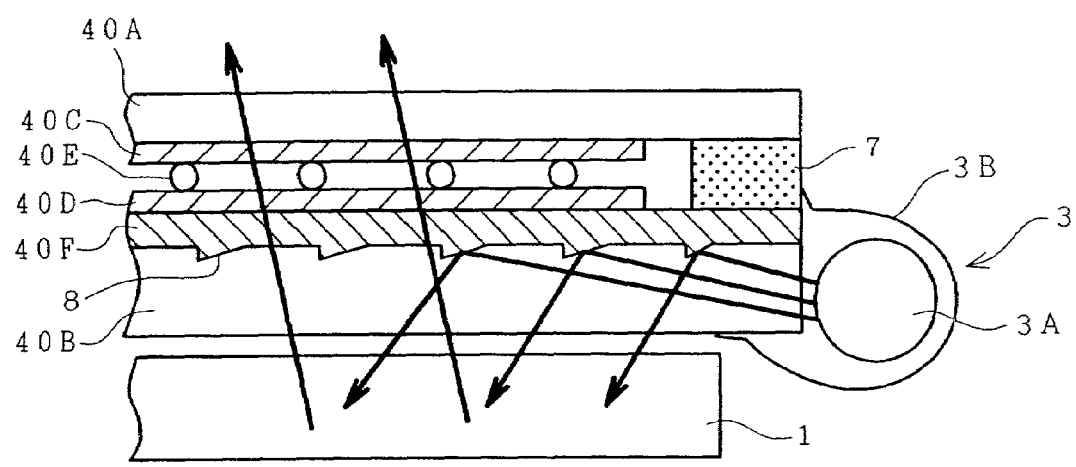
FIG. 7 is a cross-sectional view of a portion of the second embodiment, illustrating the detailed construction of the backlight in the second embodiment of the liquid crystal display device according to the present invention.

FIG. 7 is cross-sectional view of the essential portion of the second embodiment, illustrating the detailed construction of the second embodiment of the liquid crystal display device according to the present invention. The illumination-and-touch panel includes a transparent electrode 40C formed on the inner surface of the upper transparent soft substrate 40A which constitutes a touch panel portion between the lower transparent hard substrate 40B and the upper transparent soft substrate 40A, a transparent electrode 40D formed on the inner surface of the lower transparent hard substrate 40B, and spacers 40E clamped between both transparent electrodes 40C and 40D. The upper transparent soft substrate 40A and the lower transparent hard substrate 40B are fixed to each other at their ends by a sealing material 7.

It is to be noted that the construction of the touch panel 40 shown in FIG. 7 resembles that of the liquid crystal panel 1 in that the upper substrate and the lower substrate are bonded together. However, the touch panel 40 differs from the liquid crystal panel 1 in that the lower substrate 40B is made of a hard material and the upper substrate 40A is made of a soft material. In the case of the liquid crystal panel 1, to uniformize the thickness of its liquid crystal layer, both the upper substrate and the lower substrate need to be made so as not to be easily deformable.

Accordingly, as a matter of course, the present invention also differs from the approach which involves stacking two liquid crystals 1 and using one of them in place of an optical film (to be described later). This approach differs from the touch panel 40 of the present invention in that in the liquid crystal used in place of an optical film, to uniformize the thickness of its liquid crystal layer, its upper substrate and its lower substrate need to be made of a material which is not easily deformable.

An illumination light source portion includes the lower transparent hard substrate 40B, the lamp 3A and the reflecting sheet 3B for effectively using light exiting from the lamp 3A. This lower transparent hard substrate 40B functions as a light guide plate, and microprisms 8 similar to those shown in FIG. 4, which illustrates the first embodiment, are formed on the upper surface of the lower transparent hard substrate 40B (which is closer to the touch panel portion), and a transparent resin layer 40F which is smaller in refractive index than an acrylic plate is formed over the microprisms 8, i.e., under the transparent electrode 40D. This transparent resin layer 40F has the function of smoothing the formed surface of the transparent electrode 40D.

The illumination device 3, including the lamp 3A (in the present embodiment, a cold cathode fluorescent tube) and the reflecting sheet 3B, is installed along one side of the lower transparent hard substrate 40B. This illumination-and-touch panel is stacked on the display surface of the liquid crystal panel 1, thereby constituting the liquid crystal display device.

Light which has been generated from the lamp 3A propagates in the interior of the lower transparent hard substrate 40B while being reflected in the direction of the liquid crystal panel 1 by the inclined surfaces of the microprisms 8, as shown by arrows in FIG. 7.

The light reflected from the liquid crystal panel 1 is again transmitted through the lower transparent hard substrate 40B and the illumination-and-touch panel and exits upwardly.

It is desirable for the inclined surface of each of the microprisms which is closer to the lamp 3A to have an angle 20 which enables total reflection of light from the lamp 3A. These microprisms may be formed like ridges in the width direction of the light guide plate 40B (in a direction parallel to the lamp). Since the other elements of the construction are similar to those of the first embodiment, the description thereof is omitted.

According to the present invention, since the transparent hard substrate 40B is shared by the hard substrate of the touch panel and the light guide plate of the illumination device, it is possible to reduce the thickness of the liquid crystal display device.

Figure 8:
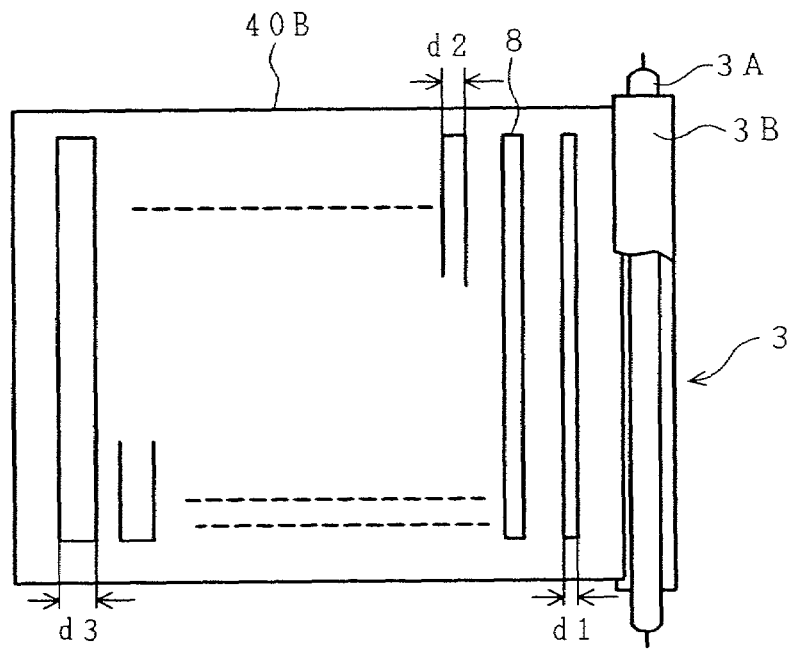
FIG. 8 is a diagrammatic plan view illustrating one example of the arrangement of ridge-like microprisms formed on a surface of a lower transparent hard substrate of the second embodiment of the liquid crystal display device according to the present invention.

FIG. 8 is a diagrammatic plan view illustrating one example of the arrangement of the ridge-like microprisms formed on the surface of the lower transparent hard substrate of the second embodiment of the liquid crystal display device according to the present invention. As shown, a multiplicity of ridge-like microprisms 8 are formed in parallel with the longitudinal direction of the lamp 3A on the upper surface of the lower transparent hard substrate 40B which constitutes the illumination-and-touch panel. Light from the lamp 3A is reflected by the inclined surfaces of the ridge-like microprisms 8 and is directed in the direction of the liquid crystal panel.

According to the present embodiment, it is possible to reflect the light of the lamp 3A toward the liquid crystal panel 1 with high efficiency, thereby improving the luminance of the liquid crystal-display device.

In addition, in the present embodiment, the luminance of light with which to illuminate the liquid crystal panel is uniformized by varying the size, specifically, the width, of each of the ridge-like microprisms 8 according to their locations on the lower transparent hard substrate 40B.

Specifically, the width d3 of a ridge-like microprism 8 which is on a side far from the lamp 3A is made larger than the width d1 of a ridge-like microprism 8 which is on a side close to the lamp 3A. According to the present embodiment, the light reflecting surface of the ridge-like microprism 8 is wider on the side far from the lamp 3A than on the side close to the lamp 3A, whereby it is possible to prevent a reduction in luminance on the side far from the lamp 3A. In addition, by selecting an intermediate value between d1 and d3 as a width d2 of a ridge-like microprism 8 which is near the middle of the lower transparent hard substrate 40B, it is possible to reduce the difference in luminance between the side close to the lamp 3A, the side far from the lamp 3A and the position near the middle.

In addition, in the present embodiment, the distance between adjacent microprisms is constant irrespective of their locations. By adjusting the distance between the adjacent microprisms 8 to the repetition distance of pixels of the liquid crystal panel 1, it is possible to prevent the occurrence of interference fringes.

Third Embodiment

Figure 9:
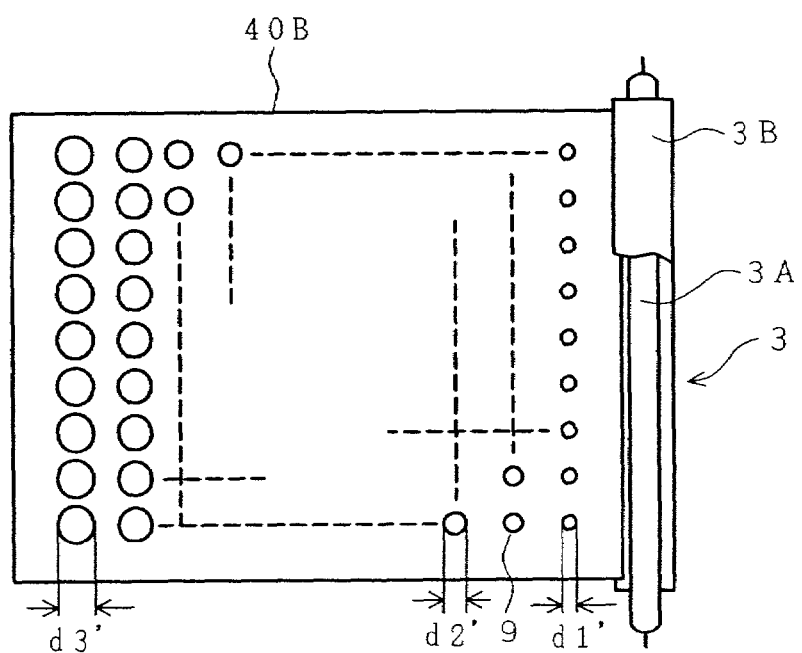
FIG. 9 is a diagrammatic plan view illustrating a third embodiment of the liquid crystal display device according to the present invention, and illustrating one example of a light scattering reflection printed pattern formed on a surface of a lower transparent hard substrate of an illumination-and-touch panel.
Figure 10:
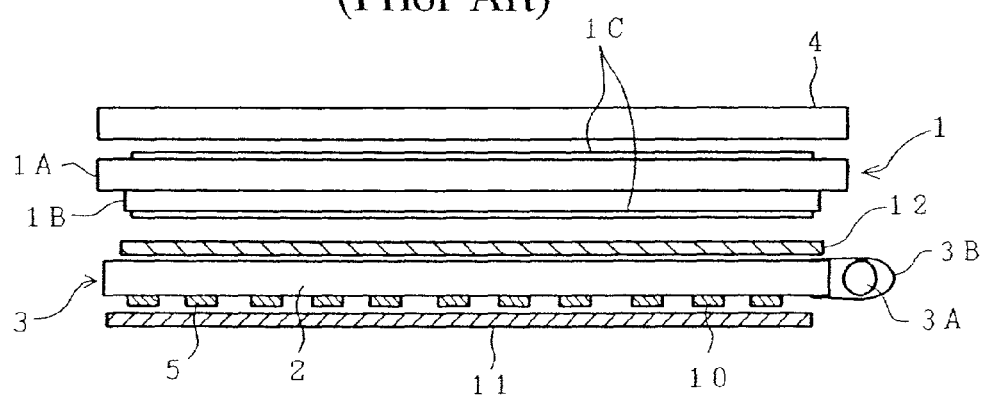
FIG. 10 is a cross-sectional view illustrating an example of a conventional liquid crystal display device provided with a transmission type of liquid crystal panel and a backlighting illumination device, i.e., a so-called backlight.

FIG. 9 is a diagrammatic plan view illustrating a third embodiment of the liquid crystal display device according to the present invention, and illustrates one example of a light scattering reflection printed pattern formed on the surface of the lower transparent hard substrate of the touch panel. The present embodiment is as a whole similar to the second embodiment shown in FIG. 5, and only the form of the surface treatment formed on the surface of the lower transparent hard substrate of the illumination-and-touch panel differs between the third embodiment and the second embodiment.

As shown, a multiplicity of light scattering reflection printed patterns 9 are formed on the upper surface of the lower transparent hard substrate 40B which constitutes the illumination-and-touch panel. A transparent resin film similar to that shown in FIG. 7 is formed over the light scattering reflection printed patterns 9.

In addition, in the present embodiment, the luminance of light with which to illuminate the liquid crystal panel is uniformized by varying the size, specifically, the diameter, of each of the light scattering reflection printed patterns 9 according to their locations on the lower transparent hard substrate 40B.

Specifically, the width d3 of a light scattering reflection printed pattern 9 which is on a side far from the lamp 3A is made larger than the width d1 of the light scattering reflection printed patterns 9 which are on a side close to the lamp 3A. According to the present embodiment, the light scattering surface of the light scattering reflection printed pattern 9 is wider on the side far from the lamp 3A than on the side close to the lamp 3A, whereby it is possible to prevent a reduction in luminance on the side far from the lamp 3A. In addition, by selecting an intermediate value between d1 and d3 as a width d2 of a light scattering reflection printed pattern 9 which is near the middle of the lower transparent hard substrate 40B, it is possible to reduce the difference in luminance between the side close to the lamp 3A, the side far from the lamp 3A and the position near the middle.

In addition, in the present embodiment, the distance between the adjacent light scattering reflection printed patterns 9 is constant irrespective of their locations. By adjusting the distance between the adjacent light scattering reflection printed patterns 9 to the repetition distance of pixels of the liquid crystal panel 1, it is possible to prevent the occurrence of interference fringes.

According to the present embodiment as well, it is possible to provide a liquid crystal display device with a touch panel, which has good visibility.

Incidentally, the touch panel or the touch panel portion in each of the above-described embodiments is an analog touch panel which identifies a coordinate position in a two-dimensional plane by detecting a variation in resistance due to contact between the transparent electrodes formed between the upper and lower substrates separated from each other by the spacers or a variation in capacitance due to a variation in the space between the transparent electrodes when the upper substrate is pressed.

Although each of the aforesaid embodiments has been described with reference to a reflection type of liquid crystal panel by way of example, the present invention is not limited to the reflection type, and can be similarly applied to the aforementioned semi-transmission type of liquid crystal panel. A so-called wedge-shaped substrate whose thickness progressively decreases from a side near that on which the lamp is installed may also be used as the light guide plate which constitutes the illumination device or the lower transparent hard substrate which constitutes the illumination-and-touch panel.

Incidentally, the liquid crystal panel used in the present invention may be either of a passive matrix type of liquid crystal panel and an active matrix type of liquid crystal panel. In the illustration of each of the above-described embodiments, various kinds of light compensation members, other than the polarizer, which are stacked on the liquid crystal panel, are omitted.

Although in each of the above-described embodiments a cold cathode fluorescent tube is used as a light source which illuminates the liquid crystal panel of the liquid crystal display device, another type of light source, such as a light emitting diode, may be installed at an edge of the transparent electrode which constitutes the light guide plate or the illumination-and-touch panel. In this case, it is desirable in terms of visibility for the light emitting diode to have a white color tone.

The present invention is not limited to any of the above-described embodiments, and various modifications can, as a matter of course, be made without departing from the technical concept of the present invention.

Fourth Embodiment

Figure 11:
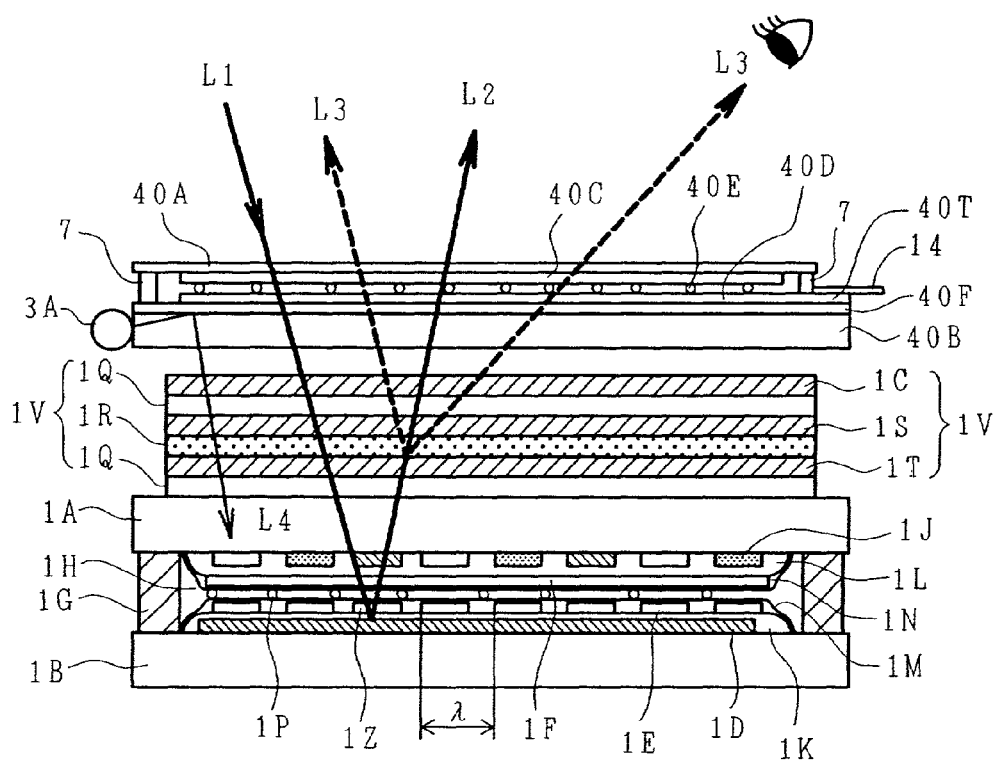
FIG. 11 is a cross-sectional view of a liquid crystal display device according to a fourth embodiment of the present invention.

FIG. 11 is a cross-sectional view of a liquid crystal display device according to a fourth embodiment of the present invention.

In the present embodiment, the linear light source 3A, such as a fluorescent lamp or an LED, and the input device 40, such as the illumination-and-touch panel made of the light guide plate 40B and the soft film 40A, are installed on a passive type liquid crystal display panel in which a plurality of signal electrodes (first pixel electrodes) and a plurality of scanning electrodes (second pixel electrodes) intersect in a matrix form.

The reflecting layer 1D made from an aluminum thin film, a protective film 1K made from an oxidation preventing film such as SiO2, and lower electrodes 1E made from a transparent conductive film such as ITO (Indium Tin Oxide) are formed on the inner surface of the first lower substrate 1B which is a lower glass substrate.

A lower alignment film 1M which covers the lower electrodes 1E is formed over the inner surface of the first lower substrate 1B.

Formed on the inner surface of the second substrate 1A, which is an upper glass substrate, are a three-color (R, G, B) color filter 1J in which a dye or a pigment is added to an organic resin film, a protective film 1L made of an organic material for preventing impurities from entering into a liquid crystal layer 1H from the color filters 1J and for flattening the inner surface of the second substrate 1A, and an upper electrode (scanning electrode) 1F made from a transparent conductive film such as ITO.

An upper alignment film 1N which covers the upper electrodes IF is formed on the inner surface of the second substrate 1A.

Incidentally, a grid- or stripe-shaped light shielding film (black matrix) is formed among individual colors R, G and B which constitute the color filter 1J, as required, and the protective film 1L is formed over the light shielding film.

The liquid crystal layer 1H made of a liquid crystal composition is injected between these first and second lower substrates 1B and 1A and is sealed by a sealing material 1G such as epoxy resin, thereby constituting the liquid crystal display panel.

Spacers 1P for uniformizing the thickness of the liquid crystal layer 1H are provided between the first and second lower substrates 1B and 1A.

The polarizer 1C, a first retardation film 1S and a second retardation film 1T are stacked on the outer (upper) surface of the second substrate 1A which is an observer-side substrate of the liquid crystal display panel. An adhesive layer 1Q made of an adhesive (for example, an epoxy- or acrylic-base adhesive) or a pressure sensitive adhesive is provided between each of the second substrate 1A, the polarizer 1C, the first retardation film 1S and the second retardation film 1T, whereby the second substrate 1A, the polarizer 1C, the first retardation film 1S and the second retardation film 1T are fixed to one another. The term "pressure sensitive adhesive" as used herein refers to an adhesive which can again bond together the optical films 1C, 1S and 1T as well as an optical film 1R even if they separate after having been bonded together. By fixing the optical films and the liquid crystal display panel to one another by using the pressure sensitive adhesive, it is possible to reproduce the optical films if the optical films are mistakenly fixed, whereby it is possible to improve the yield of manufacture of the liquid crystal display device.

It is preferable in terms of reflectance for the reflecting layer 1D to have mirror reflection characteristics, and in the present embodiment, an aluminum film is formed by an evaporation method. The surface of the reflecting layer 1D may be covered with a multi-layer film for improving reflectance, and the protective film 1K is formed on the multi-layer film for the purposes of protecting the reflecting layer 1D from corrosion and of flattening the surface thereof.

Incidentally, the reflecting layer 1D is not limited to aluminum, and may use any film that has mirror reflection characteristics, for example, a metal film such as chromium or silver or a non-metal film. The protective film 1K is not limited to a SiO2 film, and may be any insulation film that protects the reflecting layer 1D, for example, an inorganic film such as a silicon nitride film, an organic metal film such as an organic titanium film or an organic film such as polyimide or epoxy. In particular, the organic film such as polyimide or epoxy is superior in terms of flatness, whereby the lower electrodes 1E can readily be formed on the protective film 1K. If the organic metal film such as an organic titanium film is used as the protective film 1K, the lower electrodes 1E can be formed at a high temperature, whereby the wiring resistance of the lower electrodes 1E can be lowered.

The light guide plate 40B and the lamp 3A which serve as an illumination device to be used when external light is insufficient are provided above the liquid crystal panel on which a multi-layer optical film 1V is installed. The light guide plate 40B is made of a transparent resin such as an acrylic resin, and a print pattern or an unevenness pattern for causing light L4 of the lamp 3A to exit toward the liquid crystal display panel is formed on the observer-side (upper) surface of the light guide plate 40B.

In addition, this illumination device is constructed integrally with the input device 40, such as a touch panel, made of the hard substrate (light guide plate) 40B and the soft film 40A. When the surface of the input device 40 is pressed by a sharp-pointed tool like a pen or a finger, the input device 40 detects the position being pressed and outputs a data signal to be sent to a host 50 of an information processing apparatus 47.

The second substrate 1A of the liquid crystal display panel, the light guide plate 40B and the input device 40 are fixed by double-sided adhesive tape (for example, an unwoven fabric impregnated with a pressure sensitive adhesive). By using the double-sided adhesive tape, it is possible to peel these members 1A, 40B and 40A after bonding them together, whereby it is possible to reproduce the liquid crystal display panel, the illumination device and the input device if they are mistakenly fixed.

Incidentally, if no illumination is needed, the lamp 3A may be omitted. The lamp 3A may be added to the liquid crystal display panel as required.

In the present embodiment, the adhesive layer 1R which is provided between the first retardation film 1S and the second retardation film 1T has a light scattering function. Specifically, a light scattering material which differs in refractive index from the adhesive of the adhesive layer 1R is contained in the adhesive. Because the adhesive and the scattering material differ in refractive index, light is scattered in the adhesive layer 1R. The adhesive and the scattering material of the adhesive layer 1R need only differ in refractive index, and if an epoxy- or acrylic-adhesive is used as the adhesive, it is possible to use, as the scattering material, transparent organic grains such as polyethylene, polystyrene or divinylbenzene or transparent inorganic grains such as silica. Incidentally, since the adhesive needs only to differ from the scattering material in refractive index, the previously described pressure sensitive adhesive may also be used. In this case, even if the first retardation film 1S is mistakenly bonded to the second retardation film 1T, it is possible to reproduce the first retardation film 1S and the second retardation film 1T. By using transparent inorganic or organic grains as the scattering material, it is possible to improve the reflectance or spectral characteristics of the liquid crystal display device because the amount of absorption in the visible radiation range by the transparent inorganic or organic grains is small. Furthermore, if the adhesive is an organic substance, it is possible to reduce a difference in coefficient of thermal expansion by using organic grains as the scattering material, so that no cracks occur in the adhesive layer 1R.

Incidentally, if scattering material is contained in the adhesive, there is a case in which cracks easily occur in the adhesive layer as compared with the use of only the adhesive, but in the present embodiment, since the adhesive layer 1R which contains the light scattering material is provided between the first retardation film 1S and the second retardation film 1T which are substantially the same in coefficient of thermal expansion, there is no problem of cracks occurring in the adhesive layer 1R.

<Principle of Image Display>

The display principle of the liquid crystal display device according to the present embodiment will be described below.

External light (incident light) L1 such as sunlight which is radiated from various directions reaches the reflecting layer 1D through the input device 40 made of the soft film 40A and the light guide plate 40B, the polarizer 1C which transmits light along only a particular axis of polarization, the adhesive layer 1Q for fixing the polarizer 1C to the first retardation film 1S, the first retardation film 1S, the adhesive layer 1R having the light scattering function and which fixes the second retardation film 1T to the first retardation film 1S, the second retardation film 1T, the adhesive layer 1Q for fixing the second retardation film 1T to the second substrate 1A, the second substrate 1A, the color filter 1J, the upper electrodes 1F, the liquid crystal layer 1H and a particular pixel electrode (or a particular signal line) 1Z.

The external light L1 which has reached the reflecting layer 1D is reflected as reflected light L2, and the reflected light L2 reaches the adhesive layer 1R having the light scattering function, through the reverse path to that of the external light L1, i.e., via the particular pixel electrode 1Z, the liquid crystal layer 1H, the upper electrodes 1F, the color filter 1J, the second substrate 1A, the adhesive layer 1Q and the second retardation film 1T which converts the reflected light L2 into light which is easy to transmit through the polarizer 1C, by using a double refraction effect.

The reflected light L2 which has entered the adhesive layer 1R is scattered in various directions to produce scattered light L3. The direct reflected light L2 and the scattered light L3 which have exited from the adhesive layer 1R are emitted from the liquid crystal display device through the first retardation film 1S which compensates for a phase difference occurring when light passes through the liquid crystal layer 1H, by using a double refraction effect, the adhesive layer 1Q, the polarizer 1C, the input device 40 made of the light guide plate 40B and the soft film 40A. An observer can recognize an image display controlled by the particular pixel electrode 1Z, by viewing the direct reflected light L2 or the scattered light L3 emitted from the liquid crystal display device.

Incidentally, in the present embodiment, the electrodes 1E and 1F of the liquid crystal display device are arranged at intervals of a particular spacing ë. Accordingly, there is also a case in which the liquid crystal electrodes 1E and 1F optically function as a diffraction grating.

Fifth Embodiment

Figure 12:
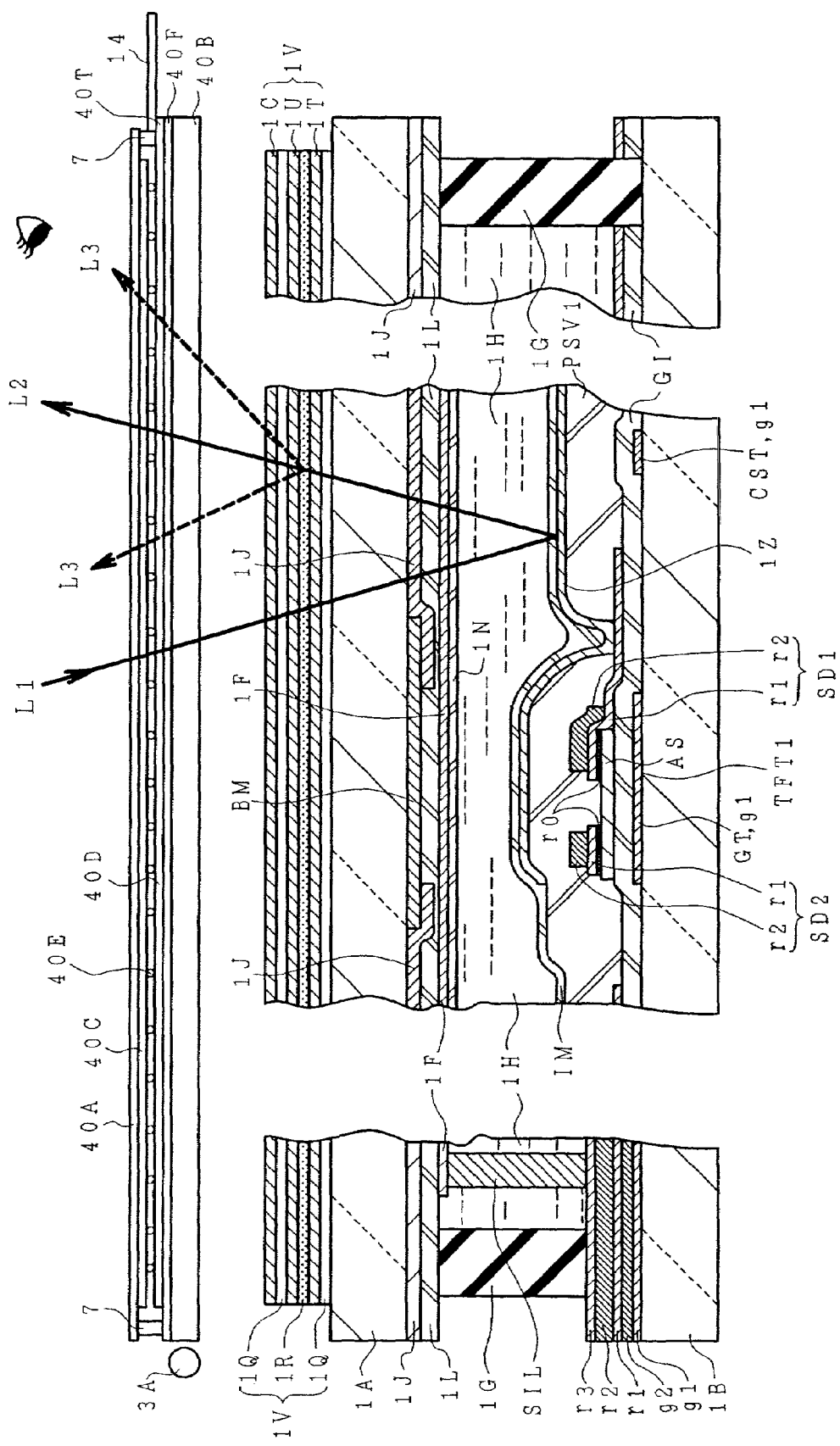
FIG. 12 is cross-sectional view of a liquid crystal display device according to a fifth embodiment of the present invention.

FIG. 12 is a cross-sectional view of a liquid crystal display device according to a fifth embodiment of the present invention. The reference numerals used in FIG. 12 are identical to those shown in FIG. 11 which has previously been described in the fourth embodiment.

The fifth embodiment is characterized in that an active matrix liquid crystal display panel using switching elements such as TFTs is used as a liquid crystal display panel.

The construction of the active matrix liquid crystal display panel will be described below, but portions which are not specifically described below are basically identical to those of the fourth embodiment which has previously been described.

In the active matrix liquid crystal display panel, as shown in FIG. 12, a plurality of pixels each having a thin-film transistor TFT1 and the pixel electrode 1Z are formed over the inside (liquid-crystal-side) surface of the first substrate 1B. Each of the pixels is disposed within an area of intersection of adjacent scanning signal lines and adjacent video signal lines. The thin-film transistor TFT1 includes a gate electrode GT provided on the first substrate 1B, a gate insulation film GI which overlies the gate electrode GT, a first semiconductor layer (channel layer) As which overlies the gate insulation film GI, a second semiconductor layer (a semiconductor layer which contains impurities) rO which overlies the first semiconductor layer As, and a source electrode SD1 and a drain electrode SD2 which overly the second semiconductor layer rO. In the present embodiment, each of the source electrode SD1 and the drain electrode SD2 is formed by a multi-layer conductive film indicated at r1 and r2, but may also be formed by only the single-layer conductive film r1. Incidentally, according to the manner of application of a voltage thereto, the relationship between the electrodes SD1 and SD2 is inverted so that the electrode SD2 becomes a source electrode and the electrode SD1 becomes a drain electrode, but in the following description, the electrodes SD1 and SD2 will be referred to for the sake of convenience. Reference numeral PSV1 denotes a protective film made of an insulation film which protects the thin-film transistor TFT1, reference numeral 4a denotes a pixel electrode, reference numeral 1M denotes a first alignment film which aligns the side of the liquid crystal layer 1H that is closer to the first substrate 1B, reference numeral IN denotes a second alignment film which aligns the side of the liquid crystal layer 1H that is closer to the second substrate 1A, and reference numeral 1F denotes an upper electrode (common electrode). Reference numeral BM denotes a light shielding film which shields the thin-film transistor TFT1 from light. The light shielding film BM is also called a black matrix and also serves the function of shielding the portion between the pixel electrode 1Z and an adjacent pixel electrode from light and of improving contrast. Symbol SIL denotes a conductive film which electrically connects the upper electrode 1F and a terminal (made of a multi-layer metal film indicated at g1, g2, r1, r2 and r3) provided on the first substrate 1B.

Similarly to an insulated-gate field effect transistor, when a selecting voltage is applied to the gate electrode GT of the thin-film transistor TFT1, the portion between the source electrode SD1 and the drain electrode SD2 conducts electrically and the thin-film transistor TFT1 functions as a switch. The pixel electrode 4a is electrically connected to the source electrode SD1, a video signal line is electrically connected to the drain electrode SD2, and a scanning signal line is electrically connected to the gate electrode GT, whereby the particular pixel electrode 4a is selected by a selecting voltage applied to the scanning signal line and a gray scale voltage applied to the video signal line can be supplied to the particular pixel electrode 4a. Symbol Cst denotes a capacitor electrode having the function of holding the gray scale voltage supplied to the pixel electrode 4a until the next selection period.

An active matrix type of liquid crystal display device has a number of features. For example, since a switching element such as a thin-film transistor is provided for each pixel, there is no problem of crosstalk occurring between different pixels, and there is no need to eliminate crosstalk by special driving such as an amplitude selective addressing method; it is possible to readily realize a display of multiple gray levels; and even if the number of scanning lines are increased, the contrast is not lowered.

In the present embodiment, the particular pixel electrode 1Z is made of a reflective metal film such as aluminum, chromium, titanium, tantalum, molybdenum or silver. In addition, in the present embodiment, since the protective film PSV1 is provided between the particular pixel electrode 1Z and the thin-film transistor TFT1, even if the particular pixel electrode 1Z is made sufficiently large to overlap the thin-film transistor TFT1, no malfunction occurs at all, whereby it is possible to realize a liquid crystal display device having high reflectance.

The present embodiment differs from the previously-described fourth embodiment in that the first retardation film 1S is not present and a third retardation film 1U for improving viewing angle characteristics is provided. The other structural features of the optical film 1V are identical to that of the optical film used in the fourth embodiment. The third retardation film 1U is also called a viewing-angle enlarging film, and is provided for the purpose of improving the dependence of the display characteristics of the liquid crystal display device upon angles by using double refraction characteristics. In the present embodiment, since the third retardation film 1U can also be formed by an organic resin-film such polycarbonate, polyacrylate or polysulfone, it is possible to prevent cracks from occurring in the light scattering adhesive layer 1R, by using the light scattering adhesive layer 1R as an adhesive layer which secures the third retardation film 1U to the second retardation film 1T.

Incidentally, in the present embodiment as well, a plurality of pixel electrodes 1Z of the liquid crystal display device are two-dimensionally arranged at intervals of a particular spacing λ, in each of the X and Y directions. Accordingly, there is a case in which the particular pixel electrode 1Z optically functions as a diffraction grating.

Figure 13:
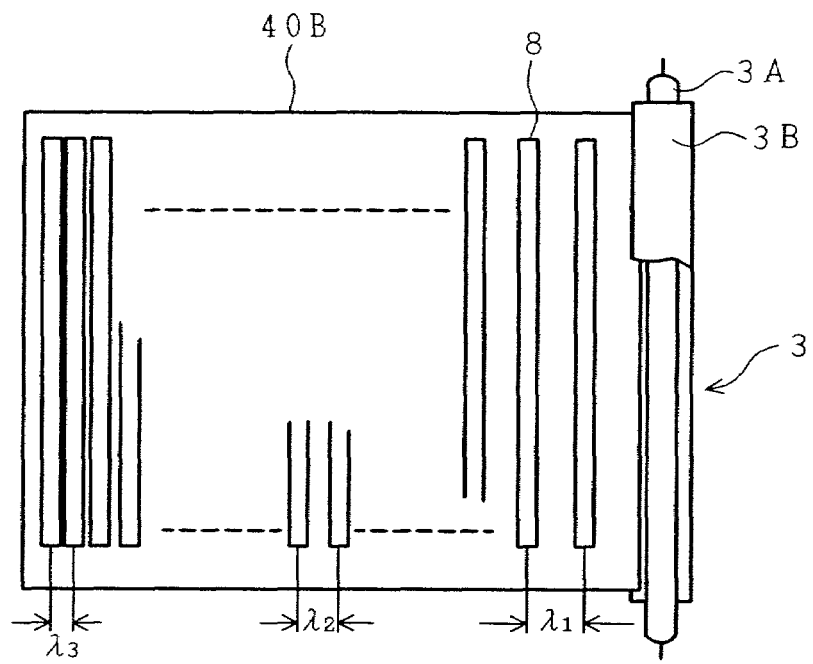
FIG. 13 is a plan view illustrating another example of the arrangement of ridge-like microprisms formed on a surface of a lower transparent hard substrate of a sixth embodiment of the liquid crystal display device according to the present invention.

FIG. 13 is a diagrammatic plan view illustrating another example of the arrangement of the microprisms formed on the surface of the lower transparent hard substrate 40B of the liquid crystal display device according to the present invention. As shown, a multiplicity of ridge-like microprisms 8 are formed in parallel with the longitudinal direction of the lamp 3A on the upper surface of the lower transparent hard substrate 40B which constitutes an illumination-and-touch panel. Light from the lamp 3A is reflected by the inclined surfaces of the ridge-like microprisms 8 and is directed in the direction of the liquid crystal panel.

In the present embodiment, the luminance of light used to illuminate the liquid crystal panel is uniformized by varying the distance between the adjacent ridge-like microprisms 8 according to their locations on the lower transparent hard substrate 40B.

Specifically, a distance $\lambda 3$ between ridge-like microprisms 8 which are on a side far from the lamp 3A is made smaller than a distance $\lambda 1$ between microprisms 8 which are on a side close to the lamp 3A. According to the present embodiment, since the density of the ridge-like microprisms 8 is higher on the side far from the lamp 3A than on the side close to the lamp 3A, it is possible to prevent a reduction in luminance on the side far from the lamp 3A. In addition, by selecting an intermediate value between $\lambda 1$ and $\lambda 3$ as a distance $\lambda 2$ between ridge-like microprisms 8 which are near the middle of the lower transparent hard substrate 40B, it is possible to reduce the difference in luminance between the side close to the lamp 3A, the side far from the lamp 3A and the position near the middle.

Incidentally, in FIG. 13, there is shown an example in which the ridge-like microprisms 8 have a constant size at any location on the lower transparent hard substrate 40B. However, in the present embodiment, it is also possible to combine an arrangement in which the distance between the adjacent ridge-like microprisms 8 is varied according to their locations on the lower transparent hard substrate 40B and an arrangement in which the ridge-like microprisms 8 are varied in size according to locations on the lower transparent hard substrate 40B.

There is a possibility that the ridge-like microprisms 8 of the lower transparent hard substrate 40B cause interference fringes between the liquid crystal electrodes 1E and 1F, but by setting the distance between the ridge-like microprisms 8 to a value in a range in which no interference fringes occur, and furthermore by varying the ridge-like microprisms 8 in size to adjust the brightness, it is possible to obtain a display with uniform brightness free of interference fringes. The other structural features of the sixth embodiment are identical to those of the previously described second embodiment.

Seventh Embodiment

Figure 14:
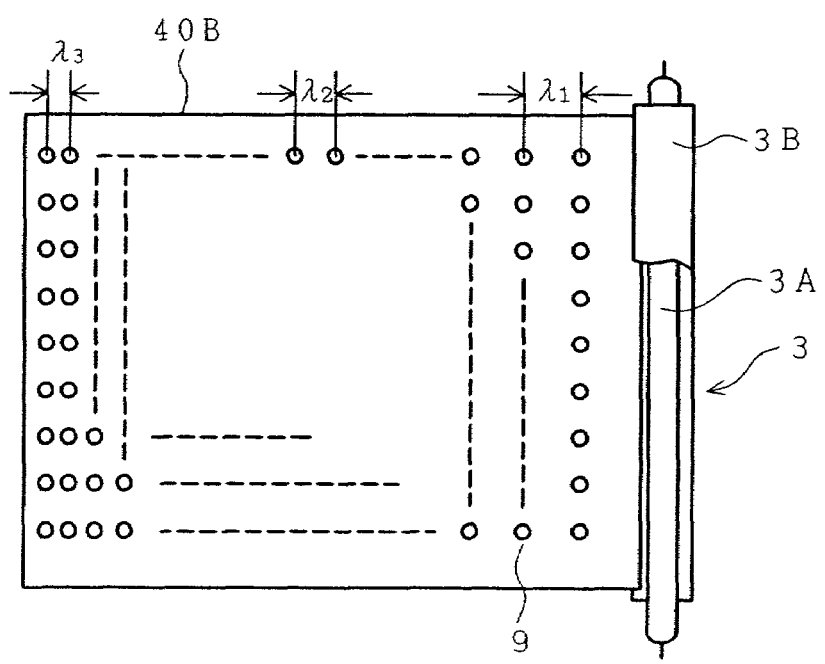
FIG. 14 is a plan view illustrating another example of the arrangement of a light scattering reflection printed pattern which is formed on a surface of a lower transparent hard substrate of a seventh embodiment of the liquid crystal display device according to the present invention.

FIG. 14 is a diagrammatic plan view illustrating another example of the arrangement of a light scattering reflection printed pattern which is formed on the surface of the lower transparent hard substrate 40B of the liquid crystal display device according to the present invention. As shown, a multiplicity of light scattering reflection printed patterns 9 are formed on the upper surface of the lower transparent hard substrate 40B which constitutes the illumination-and-touch panel. Light from the lamp 3A is reflected by the light scattering reflection printed patterns 9 and is directed in the direction of the liquid crystal panel.

In the present embodiment, the luminance of light used to illuminate the liquid crystal panel is uniformized by varying the distance between the adjacent light scattering reflection printed patterns 9 according to their locations on the lower transparent hard substrate 40B.

Specifically, a distance $\lambda 3$ between ridge-like microprisms 8 which are on a side far from the lamp 3A is made smaller than a distance $\lambda 1$ between microprisms 8 which are on a side close to the lamp 3A. According to the present embodiment, since the density of the ridge-like microprisms 8 is higher on the side far from the lamp 3A than on the side close to the lamp 3A, it is possible to prevent a reduction in luminance on the side far from the lamp 3A. In addition, by selecting an intermediate value between $\lambda 1$ and $\lambda 3$ as a distance $\lambda 2$ between ridge-like microprisms 8 which are near the middle of the lower transparent hard substrate 40B, it is possible to reduce the difference in luminance between the side close to the lamp 3A, the side far from the lamp 3A and the position near the middle.

Incidentally, in FIG. 14, there is shown an example in which the light scattering reflection printed patterns 9 have a constant size at any location on the lower transparent hard substrate 40B. However, in the present embodiment, it is also possible to combine an arrangement in which the distance between the adjacent light scattering reflection printed patterns 9 is varied according to their locations on the lower transparent hard substrate 40B and an arrangement in which the light scattering reflection printed patterns 9 are varied in size according to their locations on the lower transparent hard substrate 40B.

There is a possibility that the light scattering reflection printed patterns 9 of the lower transparent hard substrate 40B cause interference fringes between the liquid crystal electrodes 1E and 1F, but by setting the distance between the light scattering reflection printed patterns 9 to a value in a range in which no interference fringes occur, and furthermore by varying the size of each of the light scattering reflection printed patterns 9 to adjust brightness, it is possible to obtain a display with uniform brightness free of interference fringes.

The other structural features of the seventh embodiment are identical to those that of the previously described second embodiment.

Eighth Embodiment

Figure 15:
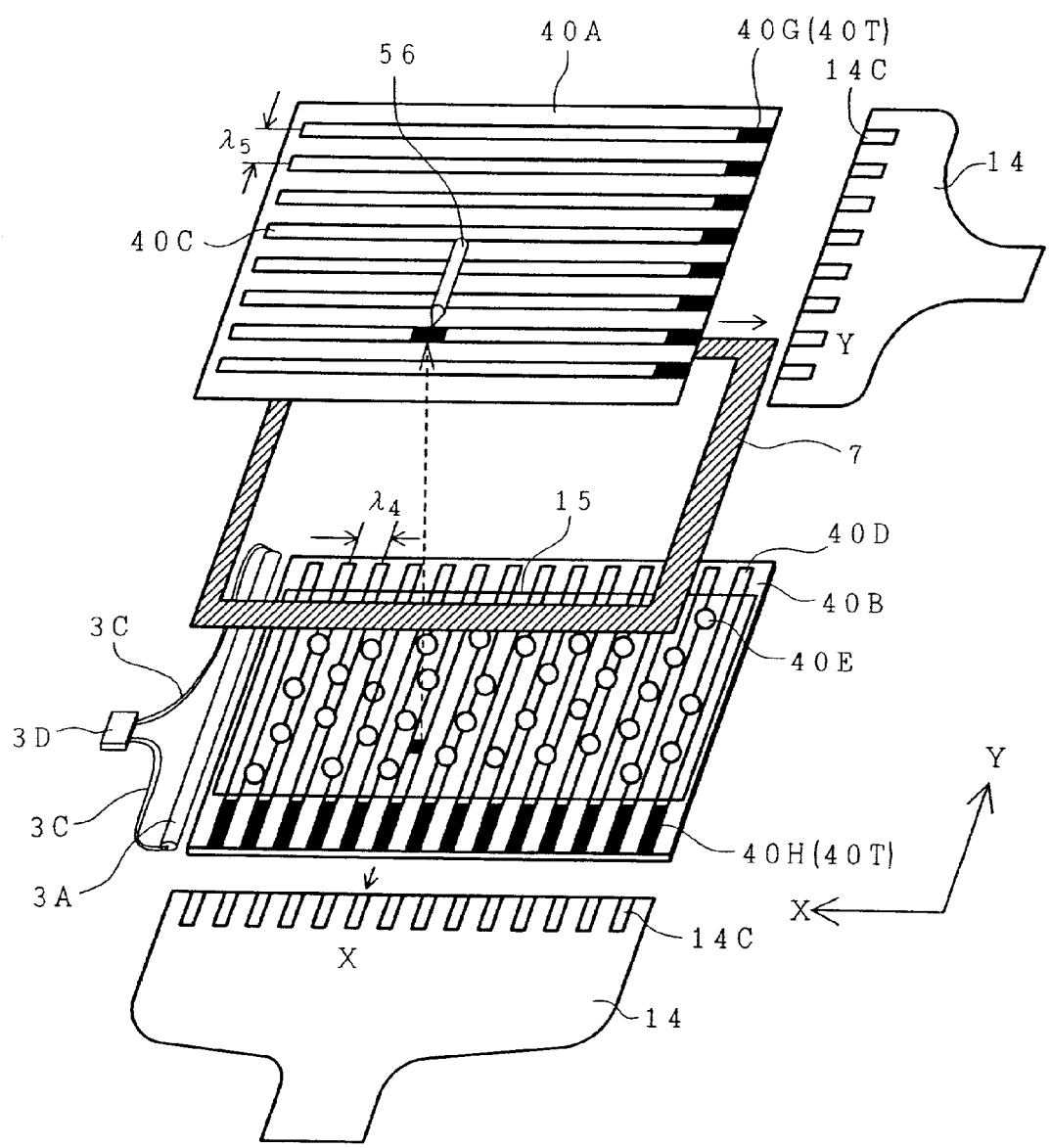
FIG. 15 is an exploded perspective view illustrating the structure of an input device of an eighth embodiment of the liquid crystal display device according to the present invention.

FIG. 15 is an exploded perspective view of a specific input device 40 which constitutes one example of the present invention.

Reference numeral 40C denotes second transparent electrodes (Y electrodes) which are formed on the lower surface of the transparent soft sheet 40A. Reference numeral 40D denotes first electrodes (X electrodes) which are formed on the upper surface of the transparent hard substrate 40B. The Y electrodes 40C and the X electrodes 40D are respectively two-dimensionally disposed in orthogonal directions to form XY matrix.

The transparent soft sheet 40A and the transparent hard substrate 40B are superimposed on each other with the insulating spacers 40E interposed therebetween. Reference numeral 7 denotes a fixing member which secures the transparent soft sheet 40A and the transparent hard substrate 40B to each other, and a double-sided adhesive tape or an adhesive are used as the fixing member 7.

Reference numeral 40G denotes the terminal of each of the Y electrodes 40C, and reference numeral 40H denotes the terminal of each of the X electrodes 40D.

Figure 25:
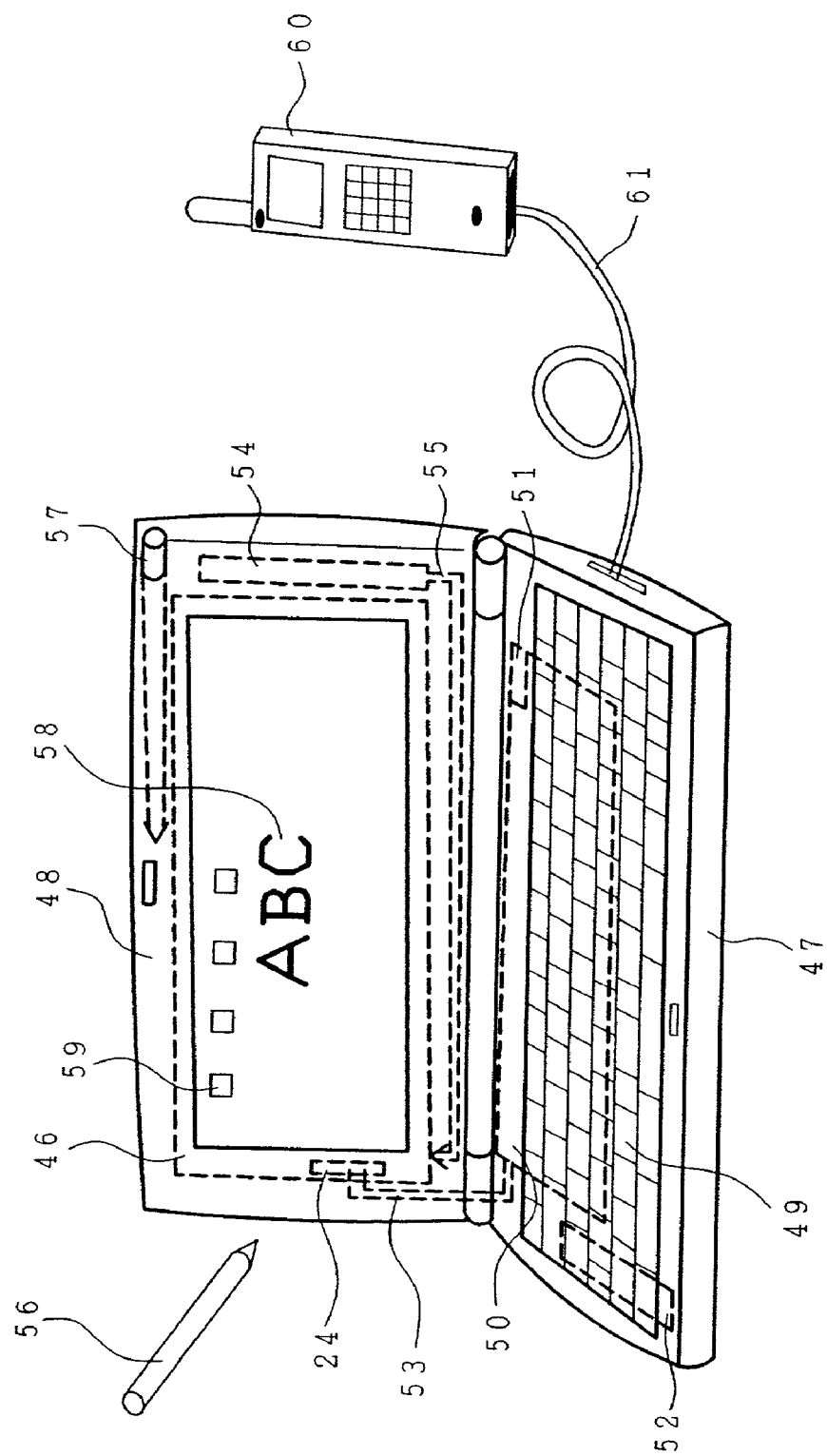
FIG. 25 is a perspective view showing the external appearance of an information processing apparatus using the liquid crystal display device according to the present invention.

The Y electrode terminals 40G and the X electrode terminals 40H are respectively connected to terminals 14C of corresponding flexible connectors 14, and the input device 40 is connected to the host computer 50, shown in FIG. 25, via the flexible connectors 14.

In the present embodiment, when one point on the transparent soft sheet 40A is pressed by a pen 56 or the like, the corresponding Y electrode 40C and X electrode 40D are electrically connected to each other, whereby the host computer 50 can recognize the position coordinates of the pressed point on the transparent soft sheet 40A.

In the present embodiment, since the Y electrodes 40C of the input device 40 are arranged at intervals of a constant spacing $\lambda 5$, the Y electrodes 40C are regarded as a diffraction grating and may cause interference fringes between the liquid crystal electrodes 1E or 1F. However, it is possible to prevent the occurrence of interference fringes by making the spacing $\lambda 5$ between the adjacent Y electrodes 40C equal to the spacing $\lambda$, between the adjacent liquid crystal electrodes 1E or 1F.

Similarly, since the X electrodes 40D of the transparent hard substrate 40B are arranged at intervals of a constant space $\lambda 4$, the X electrodes 40D are regarded as a diffraction grating and may cause interference fringes between the liquid crystal electrodes 1E or 1F. However, it is possible to prevent the occurrence of interference fringes by making the spacing $\lambda 4$ between the adjacent X electrodes 40D equal to the spacing $\lambda$ between the adjacent liquid crystal electrodes 1E or 1F.

In addition, in the present embodiment, since the fluorescent lamp 3A is provided on one side of the transparent hard substrate 40B, the input device 40 can also be used as an illumination device. Reference numeral 3C denotes a cable for applying a voltage to the fluorescent lamp 3A, and reference numeral 3D denotes a connector for connecting the cable 3C to an inverter power supply 54 which is shown in FIG. 25. Accordingly, in the present embodiment as well, the input device and the illumination device can be integrated in a manner similar to that described previously in connection with the second embodiment.

If the input device and the illumination device are integrated, terminals 40T of the input device are preferably provided on a side different from the side on which the light source 3A of the illumination device is provided. In the embodiment shown in FIG. 15, since the X electrode terminals 40H and the Y electrode terminals 40G are respectively provided on sides different from the side on which the light source 3A of the illumination device is provided, the light source 3A can be positioned without being hindered by the flexible connector 14.

Ninth Embodiment

Figure 16:
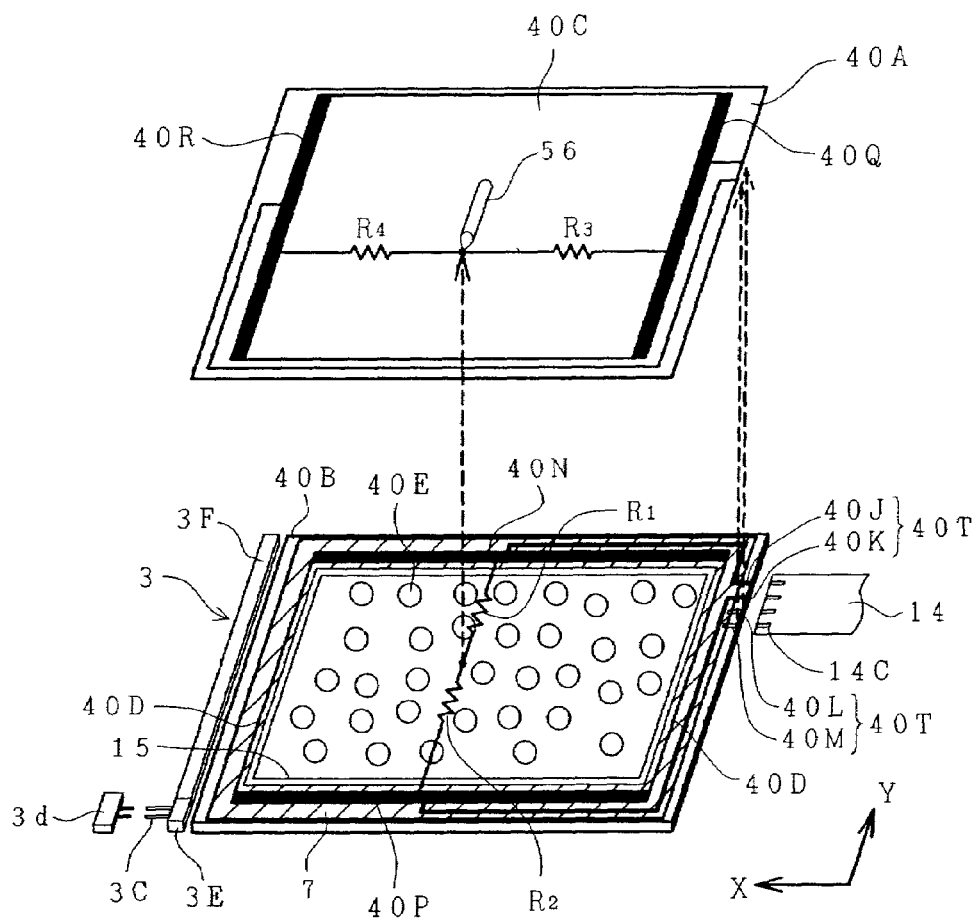
FIG. 16 is an exploded perspective view of the structure of an input device of a ninth embodiment of the liquid crystal display device according to the present invention.

FIG. 16 is an exploded perspective view of a specific input device 40 which constitutes one example of the present invention.

Reference numeral 40C denotes a second transparent electrode which is formed on the lower surface of the transparent soft sheet 40A. Reference numeral 40D denotes a first transparent electrode which is formed on the upper surface of the transparent hard substrate 40B. In the present embodiment, each of the second transparent electrode 40C and the first transparent electrode 40D is an integrated resistance film which two-dimensionally covers the whole of a coordinate input area (or display area) 15. A transparent conductive film such as ITO (Indium Tin Oxide) is used as the resistance film of each of the second transparent electrode 40C and the first transparent electrode 40D.

Reference numerals 40J and 40K denote terminals of the first transparent electrode 40D, and reference numerals 40L and 40M denote a terminal of the second transparent electrode 40C.

Reference numerals 40N and 40P denote lines provided on the transparent hard substrate 40B, respectively. Reference numeral 40N denotes a line which electrically connects the terminal 40J and one side which extends in a first direction (X direction) of the first transparent electrode 40D, and reference numeral 40P denotes a line which electrically connects the terminal 40K and the opposite side which extends in the first direction (X direction) of the first transparent electrode 40D.

Reference numerals 40Q and 40R denote lines provided on the transparent soft sheet 40A, respectively. Reference numeral 40Q denotes a line which electrically connects the terminal 40L and one side which extends in a second direction (Y direction) of the second transparent electrode 40C, and reference numeral 40R denotes a line which electrically connects the terminal 40M and the opposite side which extends in the second direction (X direction) of the second transparent electrode 40C.

In the present embodiment, since the terminals 40L and 40M are provided on the transparent hard substrate 40B, the line 40Q and the terminal 40L as well as the line 40R and the terminal 40M are electrically connected to each other by a conductive member such as silver paste. The terminals 40L and 40M may also be provided on the transparent soft sheet 40A on which the lines 40Q and 40R are provided.

Conductive films such as silver paste, aluminum, chromium or molybdenum can be used as the lines 40N and 40P of the transparent hard substrate 40B and the lines 40Q and 4OR of the transparent soft sheet 40A. In the present embodiment, by forming the patterns of the lines 40N, 40P, 40Q and 40R by a printing method using silver paste, it is possible to facilitate the manufacture of the input device 40.

The transparent soft sheet 40A and the transparent hard substrate 40B are superimposed on each other with the insulating spacers 40E being interposed therebetween. Reference numeral 7 denotes a fixing member which secures the transparent soft sheet 40A and the transparent hard substrate 40B to each other, and a double-sided adhesive tape or an adhesive is used as the fixing member 7.

In the present embodiment, since the patterns of the lines 40N, 40P, 40Q and 40R are provided in an area in which the fixing member 7 is provided, it is possible to reduce the peripheral area of the input device 40 and it is also possible to reduce an area (flame area) which does not contribute to the display produced by the liquid crystal display device.

The first transparent electrode terminals 40J and 40K as well as the first transparent electrode terminals 40L and 40M are connected to the terminal 14C of the flexible connector 14, and the input device 40 is connected to the host computer 50 shown in FIG. 25, via the flexible connector 14.

In the present embodiment, when one point on the transparent soft sheet 40A is pressed by a pen 56 or the like, the second transparent electrode 40C and the first transparent electrode 40D are electrically connected to each other at the corresponding position, whereby the host computer 50 can recognize the position coordinates of the pressed point on the transparent soft sheet 40A by measuring the relationship between resistance valuesR1, R2, R3 and R4 between the connection point and the respective terminals (40J, 40K, 40L and 40M).

In the present embodiment, the lines 40N and 40P of the transparent hard substrate are respectively connected to the entire corresponding sides of the first transparent electrode 40D, while the lines 40Q and 40R of the transparent soft sheet are respectively connected to the entire corresponding sides of the second transparent electrode 40C. Accordingly, a difference does not occur in connection resistance between the electrodes and the lines according to the position of a pressed point, whereby the position coordinates of the pressed point can be accurately measured.

In addition, in the present embodiment, since neither of the second transparent electrode 40C nor the first transparent electrode 40D is a grating-like pattern, no interference fringes occur between the liquid crystal electrodes 1E or 1F.

In addition, in the present embodiment, since the second transparent electrode 40C and the first transparent electrode 40D can be formed in a comparatively simple pattern, such as a rectangular or polygonal pattern, the input device 40 is easy to manufacture.

In the present embodiment as well, if the light source 3A is provided on one side of the transparent hard substrate 40B, the input device 40 can also be used as an illumination device. The light source 3A is provided in the form of a light emitting diode 3E and a light guide 3F which guides light emitted from the light emitting diode 3E and forms a linear light source. Reference numeral 3C denotes a cable for applying a voltage to the light emitting diode 3E, and reference numeral 3D denotes a connector for connecting the cable 3C to a direct-current power supply or a battery 52, which is shown in FIG. 25. Accordingly, in the present embodiment as well, the input device and the illumination device can be integrated in a manner similar to that described previously in connection with the second embodiment.

In the present embodiment as well, if the input device and the illumination device are integrated, the terminal 40T of the input device is preferably provided on a side different from the side on which the light source 3A of the illumination device is provided. In the embodiment shown in FIG. 16, since the first transparent electrode terminals 40J and 40K and the first transparent electrode terminals 40L and 40M are respectively provided on sides different from the side on which the light source 3A of the input device 40 is provided, the light source 3A can be positioned without being hindered by the flexible connector 14.

Tenth Embodiment

Figure 17:
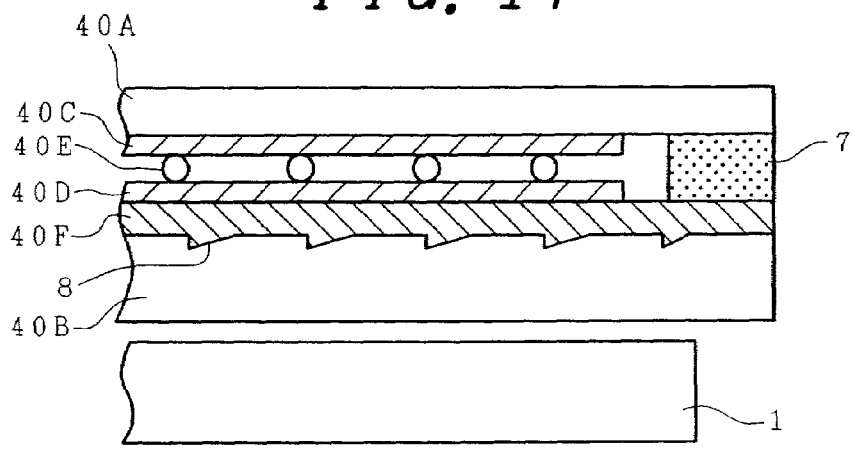
FIG. 17 is a cross-sectional view of a liquid crystal display device according to a tenth embodiment of the present invention.

FIG. 17 shows another embodiment in which the lamp 3A and the reflecting sheet 3B are removed from the second embodiment shown in FIG. 7. There are some specifications for liquid crystal display devices which require a liquid crystal display device to be formed by only a liquid crystal panel and an input device and which normally do not require an illumination device. According to the present invention, the illumination-and-touch panel 40 can be used as a touch panel if the light source such as the lamp 3A is removed, whereby constituent parts can be made common to illumination-and-touch panels and touch panels.

Of course, in accordance with the present invention, it is possible for only the illumination-device function of the illumination-and-touch panel 40 to be used.

The other structural features of the tenth embodiment are identical to those of the previously described second embodiment.

Eleventh Embodiment

Figure 18:
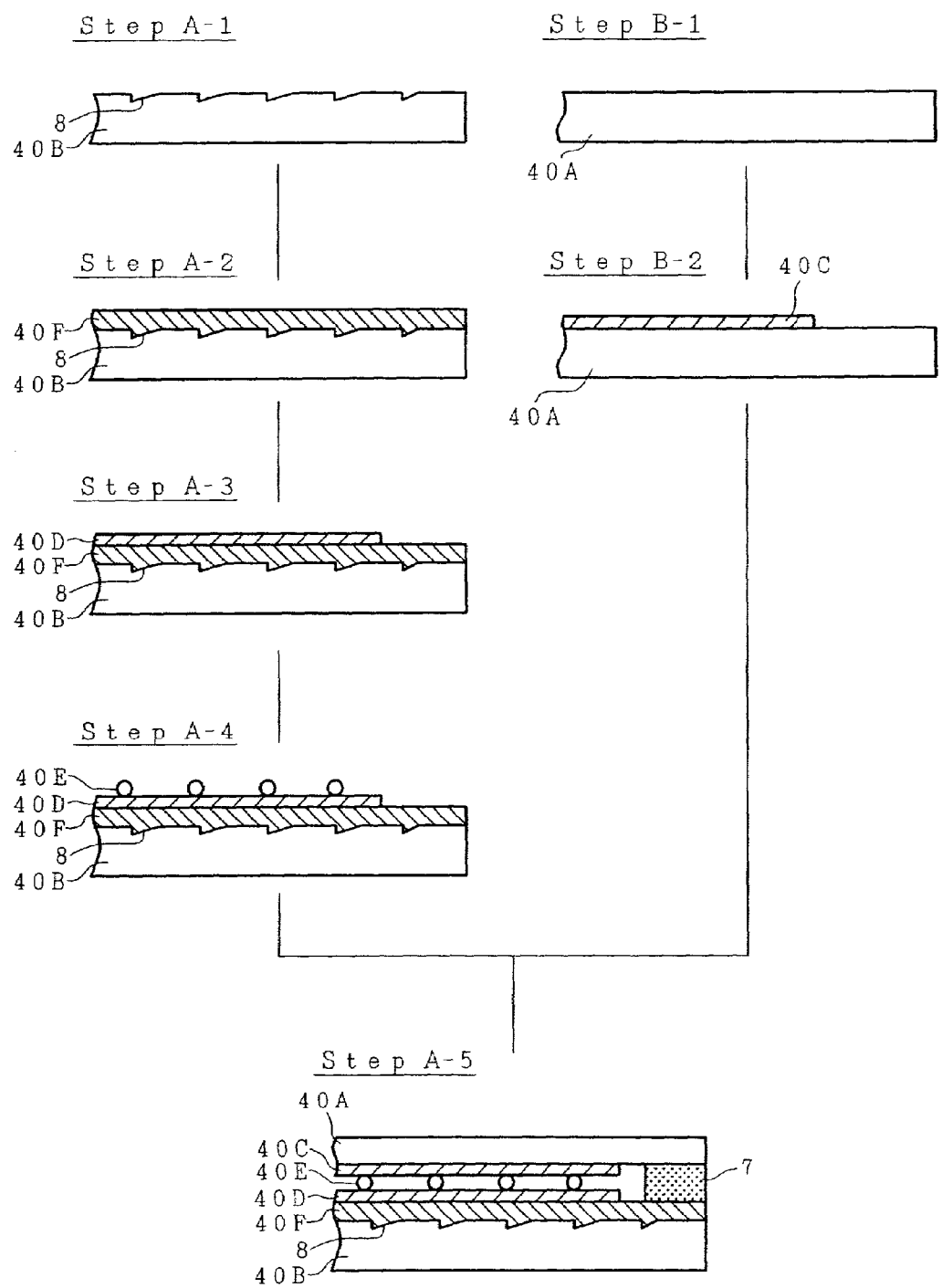
FIG. 18 is a cross-sectional process flow diagram showing a method of manufacturing an input device of a liquid crystal display device according to an eleventh embodiment of the present invention.

FIG. 18 is a process flow diagram showing one example of a method of manufacturing the illumination-and-touch panel 40 of the second embodiment shown in FIG. 7.

Step A-1

The uneven pattern 8 for reflecting light is formed on one surface of the transparent hard substrate 40B. Although acrylic resin, glass or the like may be used for the transparent hard substrate 40B, acrylic resin is preferable in terms of the easiness of processing thereof. Polyethylene terephthalate (PET) can also be used for the transparent hard substrate 40B if the transparent hard substrate 40B is made thick to improve the strength thereof. The uneven pattern 8 may have recesses, projections or any other shape that is capable of reflecting the light of the lamp 3A toward the liquid crystal panel (downwardly, in FIG. 18). The uneven pattern 8 may be formed by press working, cutting or resin molding.

Step A-2

The transparent resin layer 40F is formed over the surface of the transparent hard substrate 40B on which the uneven pattern 8 is formed. Since light is reflected by the uneven pattern 8, the transparent resin layer 40F has a refractive index different from that of the transparent hard substrate 40B. One reason why the transparent resin layer 40F is provided is to improve the adhesion of the first transparent electrode 40D to be formed later. Another reason why the transparent resin layer 40F is provided is to flatten the surface on which the uneven pattern 8 is formed and improve the flatness of the first transparent electrode 40D, thereby improving the connectivity of the touch panel.

The material of the transparent resin layer 40F preferably has good adhesion to the transparent hard substrate 40B, good transparency, and a refractive index different from that of the transparent hard substrate 40B. For example, an epoxy-base resin, a polyimide-base resin or the like can be used.

Although application or evaporation is available as the method of forming the transparent resin layer 40F, application facilitates manufacturing of the illumination-and touch panel 40.

Step A-3

A transparent conductive film such as ITO is formed on the transparent resin layer 40F, and the transparent conductive film is patterned to form the first transparent electrode 40D (the first transparent electrode).

After that, if necessary, the lines 40N and 40P and the terminals 40J, 40K, 40L and 40M are formed as shown in FIG. 16.

Evaporation, low-temperature sputtering and ion plating are available as the method of forming the transparent conductive film over the transparent hard substrate 40B and the transparent resin layer 40F, but ion plating is advantageous in terms of manufacturing costs. If acrylic resin is used for the transparent hard substrate 40B, low-temperature sputtering and ion plating both of which can form an ITO film at a low temperature are available in terms of the problem of heat resistance.

Although photoetching, mask evaporation and mask sputtering are available as the method of patterning the transparent conductive film, photoetching is advantageous in terms of the accuracy of the patterns.

Step A-4

The spacers 40E are sprayed over the first transparent electrode 40D.

Plastic spacers which are insulating substances easily deformable by pressure are used as the spacers 40E. The material of the plastic spacers is polyethylene, polystyrene, divinylbenzene, benzoguanamine resin or the like.

As a method of spraying the spacers 40E over the transparent hard substrate 40B and the first transparent electrode 40D, there are a method of mixing the spacers 40E with a volatile solvent such as alcohol and applying the spacers 40E (a wet method) and a method of blowing the spacers 40E by high-pressure air and making the spacers 40E adhere to the substrate (a dry method).

Step B-1

The transparent soft sheet 40A is prepared.

The material of the transparent soft sheet 40A may be an insulating substance which is transparent and soft. Although PET, polyvinylidene chloride or polyvinyl chloride can be used, PET is advantageous because a subsequent transparent conductive film can easily be formed.

Step B-2

A transparent conductive film such as ITO is formed on the transparent soft sheet 40A, and the transparent conductive film is patterned to form the second transparent electrode 40C (the second transparent electrode).

After that, if necessary, the lines 40Q and 40R are formed as shown in FIG. 16.

Evaporation, low-temperature sputtering and ion plating are available as the method of forming the transparent conductive film over the transparent soft sheet 40A, but ion plating is advantageous in terms of manufacturing costs.

Although photoetching, mask evaporation and mask sputtering are available as the method of patterning the transparent conductive film, photoetching is advantageous in terms of the accuracy of the patterns.

Step A-5

The transparent hard substrate 40B and the transparent soft sheet 40A are superimposed on each other with the first transparent electrode 40D and the second transparent electrode 40C being opposed to each other, and are fixed to each other by the fixing member 7, thereby finishing the input device 40.

Double-sided adhesive tape and various adhesives are available as the fixing member 7, but double-sided adhesive tape is advantageous in terms of the easiness of assembly. One example of double-sided adhesive tape is an unwoven fabric impregnated with an epoxy-base adhesive.

Furthermore, the lamp 3A and the reflecting sheet 3B which are shown in FIG. 7 are attached to the input device 40, whereby a member in which the input device 40 and the illumination device 3 are integrated is finished.

Twelfth Embodiment <Entire Construction of Liquid Crystal Display Device>

A twelfth embodiment in which any of the above-described embodiments is more specifically realized is shown in FIGS. 19a, 19b, 19c, 19d, 19e, 20a, 20b, 20c and 20d.

FIG. 19a is a front elevational view of a liquid crystal display device 46 which is assembled and finished, as viewed from the display side thereof, FIG. 19b is a front side view, FIG. 19c is a rear side view, FIG. 19d is a left side view, and FIG. 19e is a right side view.

Through FIGS. 19a to 19e, reference numeral 18 denotes an upper case (shield case) made from a metal plate such as stainless steel, iron or aluminum, and reference numeral 20 denotes a first aperture which is formed in the upper case 18 as a display window. Reference numeral 19 denotes a lower case made from a metal plate such as stainless steel, iron or aluminum, or made of plastics such as polycarbonate or ABS resin.

Reference numeral 21 denotes claws provided on the upper case 18 and reference numeral 22 denotes hooks provided on the upper case 18, and the upper case 18 is joined to the lower case 19 with the lower case 19 being fixed by the claws 21 and the hooks 22.

Reference numeral 3A denotes a light source such as a fluorescent lamp or an LED (Light Emitting Diode). Reference numeral 40B denotes a light guide which is made of a transparent material such as acrylic resin or glass and serves to illuminate the liquid crystal display panel with the light of the lamp 3A. The light source 3A and the light guide 40B constitutes an illumination device (front light) for supplying light to the liquid crystal display device 46 when external light is insufficient.

Reference numeral 40A denotes a soft film. The soft film 40A and the hard substrate (light guide) 40B constitute the input device (touch panel) 40 for inputting data to be sent to a host (information processing part) connected to the liquid crystal display device 46.

Reference numeral 1V denotes an optical film including the adhesive layer 1R, the polarizer 1C, the first retardation film 1S, the second retardation film 1T and the like which are provided over the display part of the liquid crystal display device 46. The optical film 1V is accommodated in the first aperture 20 of the upper case 18 so that the thickness of the liquid crystal display device 46 is reduced.

Figure 20A:
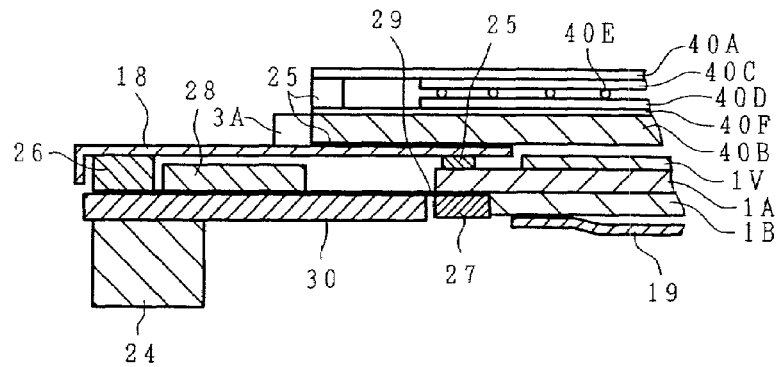
Figure 20B:
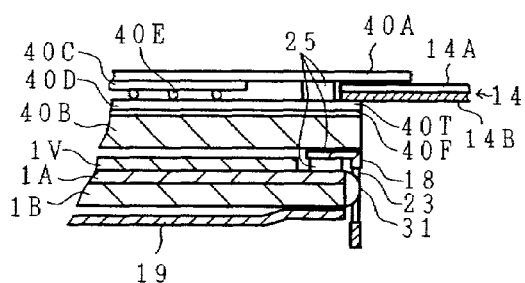
Figure 20C:
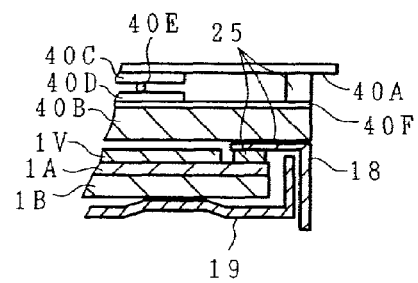
Figure 20D:
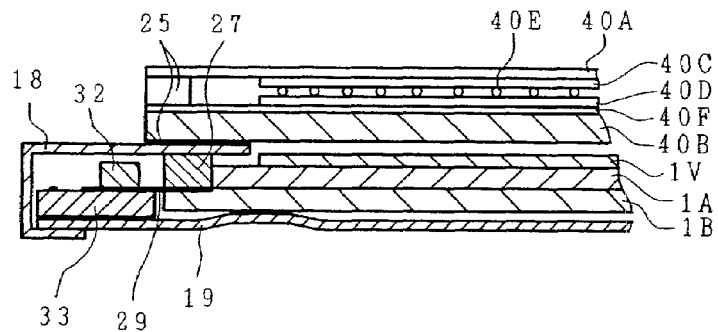

FIG. 20a is a cross-sectional view taken along line A—A of FIG. 19a, FIG. 20b is a cross-sectional view taken along line B—B of FIG. 19a, FIG. 20c is a cross-sectional view taken along fine C—C of FIG. 19a, and FIG. 20d is a cross-sectional view taken along line D—D of FIG. 19a.

The liquid crystal display panel (liquid crystal cell) is formed by bonding the first substrate 1B and the second substrate 1A together. A seal member 31 for sealing an injection hole after the liquid crystal layer 1H is injected into the liquid crystal cell is provided on side walls of the first substrate 1B and the second substrate 1A. A second aperture 23 is provided in the portion of the upper case 18 which corresponds to the seal member 31, whereby even if the seal member 31 projects, the external dimensions of the liquid crystal display device can be made small. The optical film 1V including the above-described various layers are fixed to the external (upper) surface of the second substrate 1A.

A driving circuit for the liquid crystal display panel, which includes a scanning line driving printed circuit board (scanning line driving PCB) 30, a scanning line driving IC chip 28, a flexible printed circuit board (TCP) 29, a signal line driving IC chip 32 and a signal line driving printed circuit board (signal line driving PCB) 33, is provided at the periphery of the first substrate 1B and the second substrate 1A. A signal line driving circuit is formed by the signal line driving IC chip 32, the TCP 29 and the signal line driving PCB 33, and is connected to the signal lines 1E of the first substrate 1B.

A scanning line driving circuit is formed by the scanning line driving PCB 30, the scanning line driving IC chip 28 and the TCP 29, and in the case of a matrix type liquid crystal display device using an amplitude selective addressing method, the scanning line driving circuit is connected to the scanning signal lines 1F of the second substrate 1A. Incidentally, in a liquid crystal display device using thin-film transistors (TFTs), since scanning lines are provided on the first substrate 1B on which signal lines are provided, the scanning line driving circuit is connected to the first substrate 1B. Reference numeral 24 denotes an interface connector for electrically connecting the liquid crystal display device 46 to the host 50 which is an external circuit. In the present embodiment, although the interface connector 24 is provided on the scanning line driving PCB 30, the interface connector 24 may also be provided on the signal line driving PCB 33. Incidentally, although not shown, the scanning line driving PCB 30 and the signal line driving PCB 33 are electrically connected to each other by connection means. Reference numeral 26 denotes a spacer for securing the scanning line driving PCB 30. Reference numeral 27 denotes a spacer for securing the portion for connection between the liquid crystal display panel and the scanning line driving circuit as well as the signal line driving circuit, and the spacer 27 is made of an insulating elastic material such as rubber. Reference numeral 25 denotes double-sided adhesive tape, and, for example, an unwoven fabric impregnated with an epoxy-base adhesive can be used as the double-sided adhesive tape 25. In the present embodiment, the liquid crystal display panel is fixed to the upper case 18 by the double-sided adhesive tape 25. The double-sided adhesive tape 25 is also used for fixing the light guide 40B and the soft film 40A of the illumination-and-input device 40 to the upper case 18. According to the present embodiment, by fixing the individual members using the double-sided adhesive tape 25, the assembly of the liquid crystal display device is made easy so that even if the individual members are erroneously fixed, they can be readjusted, and so the manufacturing yield of the liquid crystal display device is improved. An uneven pattern for securing the liquid crystal panel is formed on the lower case 19.

Thirteenth Embodiment

Figure 21:
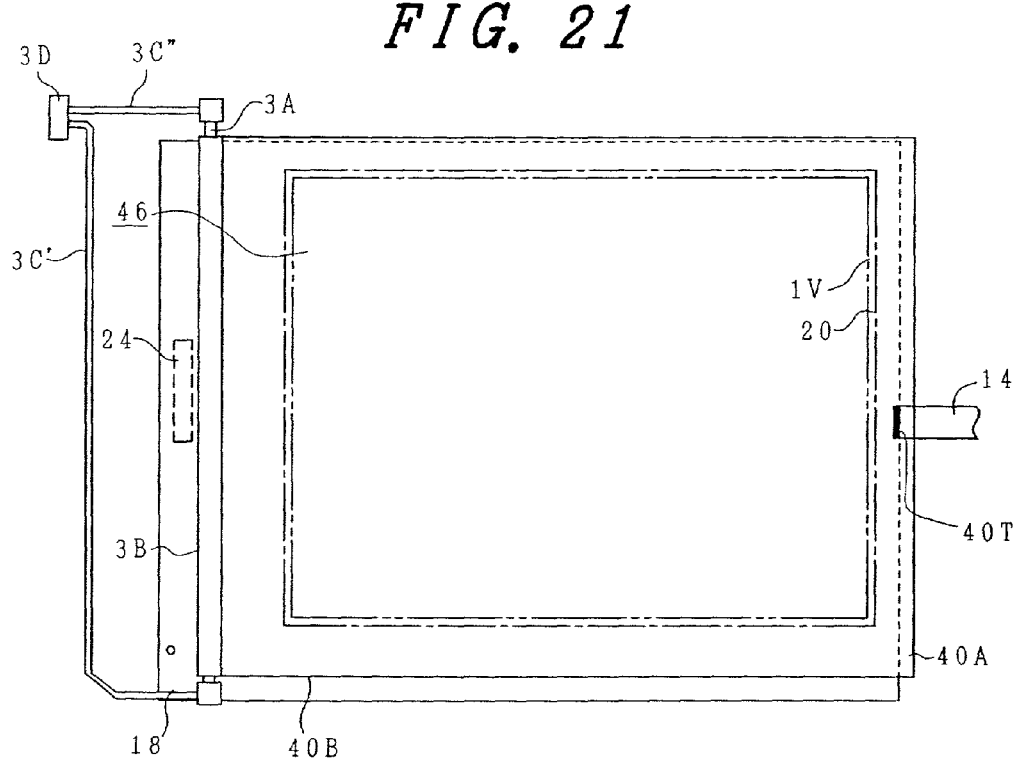
FIG. 21 is a plan view of a liquid crystal display device according to a thirteenth embodiment of the present invention.

FIG. 21 shows an example in which the light source 3A is used as a fluorescent tube in the previously-described twelfth embodiment. In the present embodiment, the light source 3A is provided on a shorter side of the input device 40. Reference numeral 3C' denotes a lower-voltage cable of the light source 3A, reference numeral 3C" denotes a higher-voltage cable of the light source 3A, and reference numeral 3D denotes a connector for the cables 3C' and 3C". In the present embodiment, since a high voltage of high frequency is applied across the cables 3C' and 3C" of the light source 3A, the connector 3D for the light source 3A and the interface connector 24 are separately provided. In the present embodiment, the terminal 40T and the connector 14 for a touch panel are provided on the side of the light guide plate 40 on which the light source 3A is not provided.

The other structural features of the thirteenth embodiment are similar to those of the twelfth embodiment.

Fourteenth Embodiment

Figure 22:
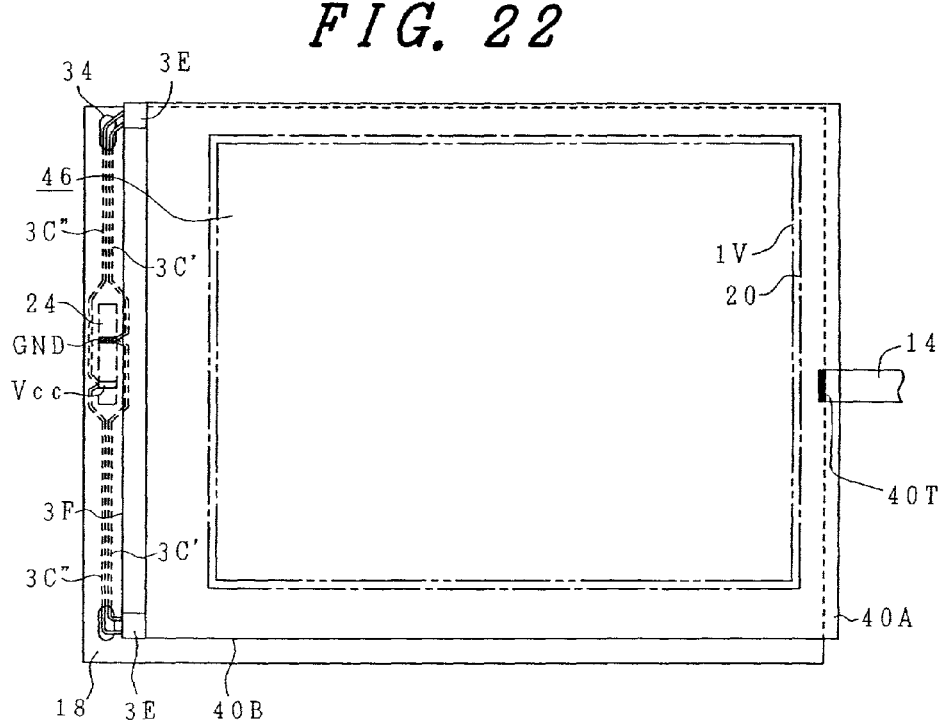
FIG. 22 is a plan view of a liquid crystal display device according to a fourteenth embodiment of the present invention.

FIG. 22 shows an example in which the light emitting diode 3E is used as a light source in the previously-described twelfth embodiment. Reference numeral 3F denotes a light guide for converting the light of the light emitting diode 3E into linear light. In the present embodiment, the light guide 3F for the light emitting diode 3E is provided on a shorter side of the light guide plate 40. Reference numeral 3C' denotes a lower-voltage cable of the light emitting diode 3E, and reference numeral 3C" denotes a higher-voltage cable of the light emitting diode 3E. In the present embodiment, since a direct-current low voltage is applied across the cables 3C' and 3C" of the light emitting diode 3E, the interface connector 24 can also be used as a connector for the light emitting diode 3E. In the present embodiment as well, the terminal 40T and the connector 14 for a touch panel are provided on the side of the light guide plate 40B on which neither the light emitting diode 3E nor the light guide 3F is provided.

The other structural features of the fourteenth embodiment are similar to those of the twelfth embodiment.

Fifteenth Embodiment

Figure 23:
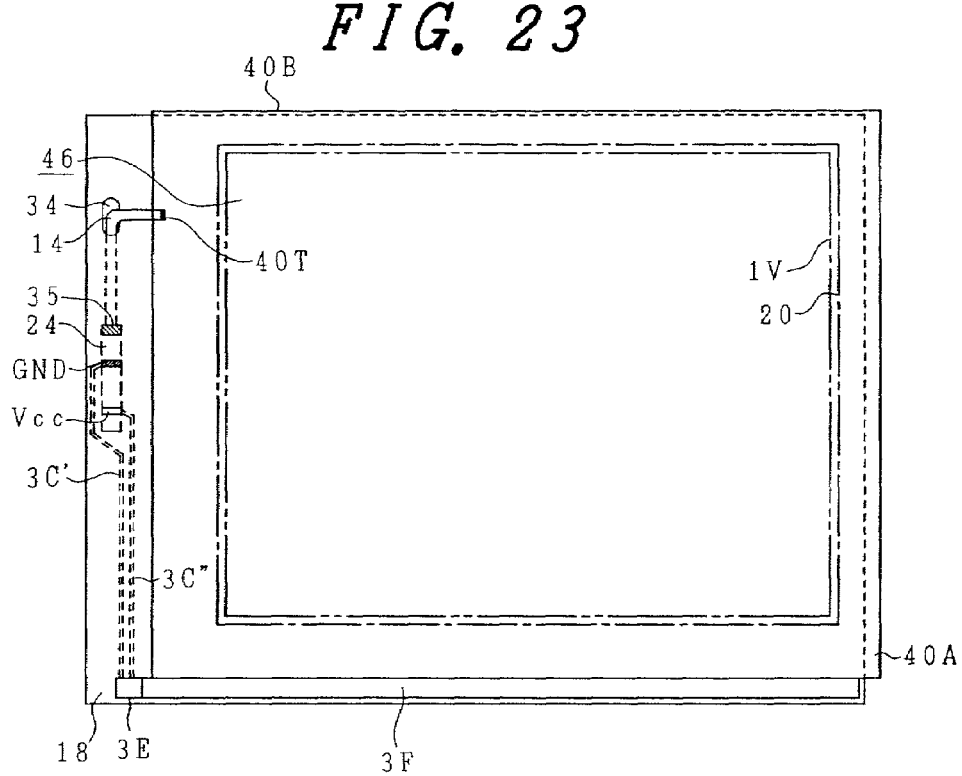
FIG. 23 is a plan view of a liquid crystal display device according to a fifteenth embodiment of the present invention.

FIG. 23 shows another example in which the light emitting diode 3E is used as a light source in the previously-described twelfth embodiment. Reference numeral 3F denotes a light guide for converting the light of the light emitting diode 3E into a linear light source. In the present embodiment, the light guide 3F for the light emitting diode 3E is provided on a longer side of the light guide plate 40B. Reference numeral 3C' denotes a lower-voltage cable of the light emitting diode 3E, and reference numeral 3C" denotes a higher-voltage cable of the light emitting diode 3E. In the present embodiment as well, since a direct-current low voltage is applied across the cables 3C' and 3C" of the light emitting diode 3E, the interface connector 24 can also be used as a connector for the light emitting diode 3E. In the present embodiment as well, the terminal 40T and the connector 14 for a touch panel are provided on the side of the light guide plate 40B on which neither the light emitting diode 3E nor the light guide 3F is provided.

Furthermore, in the present embodiment, the light guide 3F for the light emitting diode 3E is provided on a side of the light guide plate 40B which is different from the side adjacent to the interface connector 24. Accordingly, in the present embodiment, terminals can be provided on the side adjacent to the interface connector 24, and the terminal 40T of the input device 40 and a data terminal 35 of the interface connector 24 can be connected to each other by a flexible connector, whereby the interface connector 24 can be used as connection means common to a liquid crystal driving circuit and the input device 40. Furthermore, in the present embodiment, since the interface connector 24 is also used as the connector for the light emitting diode 3E, the connection between an information processing apparatus and the host 50 can be realized by the interface connector 24 alone, whereby the size and reliability of the information processing apparatus can be improved.

The other structural features of the fifteenth embodiment are similar to those of the twelfth embodiment.

Sixteenth Embodiment

Figure 24:
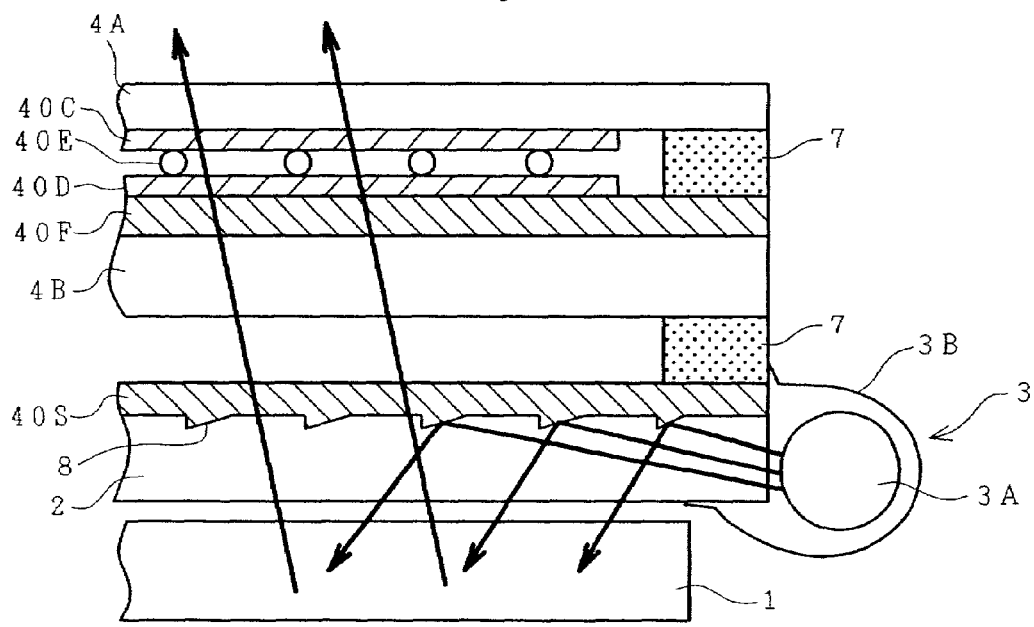
FIG. 24 is a cross-sectional view of a liquid crystal display device according to a sixteenth embodiment of the present invention.

FIG. 24 shows an embodiment of a liquid crystal display device in which the input device 40 manufactured by the method shown in FIG. 18 as the eleventh embodiment, the illumination device 3 manufactured separately from the input device 40, and the liquid crystal panel 1 are assembled in a superimposed manner. According to the present embodiment, since the illumination-and-input device 40 can be used as a touch panel if a light source such as the light source 3A is removed, the illumination device 3 manufactured separately and the liquid crystal panel 1 can be superimposed on each other to realize a liquid crystal display device having an illumination device and an input device. Double-sided adhesive tape can be used as the means 7 for fixing the individual members.

In the present embodiment, the effect of integrating the input device and the illumination device is not obtained, but since the transparent resin layer 40F is provided between the transparent hard substrate 40B such as acrylic resin and the first transparent electrode 40D made of ITO or the like, it is possible to obtain the effect of flattening the surface of the transparent electrode 40D, the effect of uniformizing the film thickness of the transparent electrode 40D and also uniformizing the electrical resistivity thereof, and the effect of preventing the transparent electrode 40D from peeling off. Accordingly, in the present embodiment, the input device 40 having high reliability can be used with the liquid crystal display device. In addition, since the transparent electrode 40D is provided on a flat surface of the transparent resin layer 40F provided on the transparent hard substrate 40B, the film thickness of the transparent electrode 40D can be uniformized and also the electrical resistivity thereof can be uniformized. In particular, in a resistance film type of touch panel like the ninth embodiment shown in FIG. 16, the accuracy of recognition of position coordinates becomes higher.

The other construction of the sixteenth embodiment is identical to that of the second embodiment described previously.

Incidentally, in the present embodiment, since the input device 40 is not used as an illumination device, neither the uneven pattern 8 nor the reflection printed pattern 9 is provided on the transparent hard substrate 40B.

Conversely, the uneven pattern 8 or the reflection printed pattern 9 is provided on the light guide plate 2 of the illumination device 3. Furthermore, if a second transparent resin layer 40S is provided over the uneven pattern 8 or the reflection printed pattern 9 of the light guide plate 2, the reflectance of the light guide plate 2 is improved and the luminance of the liquid crystal display device is improved. The material of the second transparent resin layer 40S may be any material that has a refractive index different from that of the light guide plate 2. If the light guide plate 2 is formed of an acrylic resin, a polyimide resin or an acrylic-base resin can be used.

Applied Example of Present Invention

FIG. 25 is a perspective view showing the external appearance of the information processing apparatus 47 using the liquid crystal display device 46 according to the present invention. Reference numeral 48 denotes a display part of the information processing apparatus 47, reference numeral 49 denotes a keyboard part, reference numeral 50 denotes a host which performs information processing for the information processing apparatus 47, reference numeral 51 denotes a microprocessor, reference numeral 52 denotes a battery, reference numeral 53 denotes an interface cable which connects the liquid crystal display device 46 and the host computer 50, reference numeral 54 denotes an inverter power supply for an illumination device, reference numeral 55 denotes a cable which connects the inverter power supply 54 and a light source 14 of the illumination device, reference numeral 56 denotes a pen for inputting information by using an input device 15, reference numeral 60 denotes a mobile telephone, and reference numeral 61 denotes a cable which connects the mobile telephone 60 and the information processing apparatus 47.

In the present applied example, the liquid crystal display device 46 is provided in the display part 48 of the information processing apparatus 47. In the liquid crystal display device of the present applied example, since the input device 15 and the display part 48 are superimposed on each other, characters 58 can be inputted or an icon 59 can be selected to execute a function of the software, by pressing a predetermined portion with the pen 56 or a finger. In addition, since the liquid crystal display device 46 of the present applied example is of a reflection type, the power consumption can be reduced by turning off the switch of the inverter power supply 54 when there is external light such as sunlight, so that a consumption of the power of the battery 52 can be lessened.

Furthermore, according to the present applied example, since the liquid crystal display device 46 can be made thin, small and light-weight, the information processing apparatus 47 can also be made thin, small and light-weight.

As described above, in accordance with the present invention, it is possible to improve the coordinate recognition characteristics of an information input device (touch panel) provided on a liquid crystal panel.

In addition, in accordance with the present invention, it is possible to provide a reflection or semi-transmission type of liquid crystal display device in which a touch panel is stacked on the display surface of its liquid crystal panel and its entire effective display area, is uniformly illuminated by a front illumination system so that a high-quality image display can be obtained and the brightness of a screen is improved.

What is claimed is:

1. A liquid crystal display device comprising:
a liquid crystal display panel having a first surface for displaying an image and a second surface different from said first surface; and
a position information input device provided on a first-surface side of said liquid crystal display panel;
wherein said position information input device is made of a first substrate and a second substrate more easily deformable than said first substrate;
a transparent insulation film having adhesive properties is formed in contact with a surface of said first substrate opposed to said second substrate;
a first transparent electrode is provided in contact with said transparent insulation film; and
said transparent insulation film being located between said first substrate and said first transparent electrode;
wherein said surface of said first substrate opposed to said second substrate has at least one recess portion therein, and said transparent insulation film covers said at least one recess portion to reduce unevenness of a surface over which said first transparent electrode is provided.

2. A liquid crystal display device according to claim 1, wherein said first substrate of said position information input device is provided between said second substrate and said liquid crystal display panel.

3. A liquid crystal display device according to claim 2, wherein a second transparent electrode is provided over a surface of said second substrate opposed to said first substrate.

4. A liquid crystal display device according to claim 3, wherein a spacer made of an insulating material is provided between said first substrate and said second substrate.

5. A liquid crystal display device according to claim 4, wherein said first substrate and said second substrate are fixed to each other by double-sided adhesive tape.

6. A liquid crystal display device according to claim 1, wherein said transparent insulation film is at least one of an evaporated and applied transparent insulation film formed in contact with a surface of said first substrate.

7. A liquid crystal display device comprising:
a liquid crystal display panel having a first surface for displaying an image and a second surface different from said first surface; and
a position information input device provided on a first-surface side of said liquid crystal display panel;
wherein said position information input device is made of a first substrate and a second substrate more easily deformable than said first substrate, a surface of said first substrate opposed to said second substrate being an uneven surface;
a transparent insulation film having adhesive properties is formed over said uneven surface of said first substrate opposed to said second substrate;
a first transparent electrode is provided in contact with said transparent insulation film; and
said transparent insulation film being located between said first substrate and said first transparent electrode;
wherein said uneven surface of said first substrate opposed to said second substrate has at least one recess portion therein, and said transparent insulation film covers said at least one recess portion to reduce unevenness of a surface over which said first transparent electrode is provided.

8. A liquid crystal display device according to claim 7, wherein said transparent insulation film is at least one of an evaporated and applied transparent insulation film formed over said uneven surface of said first substrate, and said first substrate of said position information input device is provided between said second substrate and said liquid crystal display panel.

9. A liquid crystal display device according to claim 8, wherein a second transparent electrode is provided over a surface of said second substrate opposed to said first substrate.

10. A liquid crystal display device according to claim 9, wherein a spacer made of an insulating material is provided between said first substrate and said second substrate.

11. A liquid crystal display device according to claim 10, wherein said first substrate and said second substrate are fixed to each other by double-sided adhesive tape.

12. A liquid crystal display device comprising:
a liquid crystal display panel having a first surface for displaying an image and a second surface different from said first surface; and
a position information input device provided on a first-surface side of said liquid crystal display panel;
wherein said position information input device is made of a first substrate and a second substrate more easily deformable than said first substrate;
a printed layer for partly reflecting light is formed on a surface of said first substrate opposed to said second substrate;
a transparent insulation film is formed over said surface of said first substrate opposed to said second substrate;
a first transparent electrode is provided on said transparent insulation film; and
said transparent insulation film being located between said first substrate and said first transparent electrode;
wherein said transparent insulation film covers said printed layer to reduce unevenness of a surface over which said first transparent electrode is provided.

13. A liquid crystal display device according to claim 12, wherein said first substrate of said position information input device is provided between said second substrate and said liquid crystal display panel.

14. A liquid crystal display device according to claim 13, wherein a second transparent electrode is provided over a surface of said second substrate opposed to said first substrate.

15. A liquid crystal display device according to claim 14, wherein a spacer made of an insulating material is provided between said first substrate and said second substrate.

16. A liquid crystal display device according to claim 15, wherein said first substrate and said second substrate are fixed to each other by double-sided adhesive tape.

* * * * *